(12) United States Patent
Yoshida et al.

(10) Patent No.: US 6,407,512 B1
(45) Date of Patent: Jun. 18, 2002

(54) FLASHING DEVICE OF AN AUTOMATIC LIGHT-REGULATION TYPE

(75) Inventors: Yutaka Yoshida; Takaaki Kotani; Katsumi Motomura; Wataru Sasaki; Yoshiaki Yamamoto; Hiroyuki Uchiyama, all of Saitama (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/710,874

(22) Filed: Nov. 14, 2000

(30) Foreign Application Priority Data

Nov. 19, 1999 (JP) .............................. 11-330314
Nov. 19, 1999 (JP) .............................. 11-330315
Mar. 21, 2000 (JP) .............................. 2000-077735

(51) Int. Cl.⁷ .............................................. H05B 37/00
(52) U.S. Cl. .................... 315/241 P; 315/151; 315/158; 315/362; 396/180
(58) Field of Search .......................... 315/200 A, 241 P, 315/151, 158, 171–173, 225, 238, 362, 356; 396/180

(56) References Cited

U.S. PATENT DOCUMENTS

| 4,078,240 A | * | 3/1978 | Kaneko et al. | ...... 315/241 P X |
| 4,422,743 A | * | 12/1983 | Izumi et al. | ......... 315/241 P X |
| 4,457,611 A | * | 7/1984 | Ishida et al. | ................ 354/415 |
| 5,083,062 A | * | 1/1992 | Ichihara | ................... 315/241 P |
| 5,640,623 A | * | 6/1997 | Sasaki | ........................ 396/180 |

* cited by examiner

Primary Examiner—Haissa Philogene
(74) Attorney, Agent, or Firm—Young & Thompson

(57) ABSTRACT

Flash light is repeatedly emitted in a pulse state by intermittently turning on and off an IGBT. The flash light reflected by a subject is received by a phototransistor to integrate a received light amount with a capacitor. While the IGBT is turned off, a charging voltage of the capacitor is converted to digital data. Based on the obtained data, it is judged whether emitting the flash light is stopped or not.

15 Claims, 24 Drawing Sheets

FLASHING DEVICE OF AN AUTOMATIC LIGHT-REGULATION TYPE

BACKGROUND OF THE INVENTION

1. Field of the Invention

The present invention relates to a flashing device of an automatic light-regulation type.

2. Description of the Related Art

It is known that there is a camera having a built-in flashing device of an automatic light-regulation type. In this flashing device, the flash light reflected by a subject is received by a light receiving circuit to integrate a light amount. The light receiving circuit comprises a light receiving element. When an integral voltage corresponding to the integrated amount reaches a predetermined reference voltage, discharge of a main capacitor is intercepted in a flash discharge tube so that flashing is stopped. In this way, a flash-light amount is regulated so as to obtain a proper exposure amount.

In order to judge whether or not the integral voltage reaches the reference voltage, the reference voltage and the integral voltage are generally applied to a voltage comparator to compare these voltages in an analog amount. When the integral voltage reaches the reference voltage, an output signal from the voltage comparator is changed. For example, connection between the flash discharge tube and the main capacitor is intercepted by a semiconductor switching element to stop the flash light.

Meanwhile, the light receiving circuit is generally constituted of a light receiving element and a capacitor. The light receiving element is, for example, a photo transistor or a photo diode. The flash light reflected by a subject is received with the light receiving element. Then, the capacitor is charged by a photocurrent corresponding to an amount of the received light to integrate the light amount. A charging voltage of the capacitor is outputted as an integral voltage corresponding to the integrated amount.

By the way, as to the above-mentioned light receiving circuit, it is difficult to dissolve the dispersion of its photosensitivity. In other words, even if the light receiving circuit is constituted of the light receiving element and the capacitor which are of the same standard, and even if the same light amount is applied to the light receiving element, the dispersion of the outputted integral voltage is caused. The dispersion of the photosensitivity is especially drawn by dispersion of the light receiving element itself, for example a photo transistor. When the photosensitivity of the light receiving circuit has the dispersion, a light regulation level does not become constant. Hence, a proper exposure amount is not obtained. In view of this, the light regulation level is adjusted at the time of manufacturing the flashing device of the automatic light-regulation type.

As to methods for adjusting the light regulation level, there are some methods, in one of which, the reference voltage inputted into the voltage comparator is adjusted, and in another of which, the photosensitivity itself of the light receiving circuit is adjusted. In the former method, a variable resistor is provided in a circuit for generating the reference voltage. By changing a resistance value of the variable resistor, the reference voltage is increased or decreased so as to be adjusted in accordance with the photosensitivity of the light receiving circuit. Meanwhile, in the latter method, a filter having a proper density (transmittance) is disposed in front of the light receiving element. In another way, a circuit constant of the light receiving circuit, for example capacity of the capacitor is increased or decreased. Owing to this, a ratio of the outputted integral voltage to the incidence-light amount of the light receiving circuit, namely the photosensitivity is adjusted.

However, in the above-mentioned flashing device using the voltage comparator, many parts are required for automatically regulating the light. As the required parts, there are the voltage comparator, a circuit for generating the reference voltage, a circuit for adjusting the reference voltage, and so forth. Due to these parts, it is prevented to be downsized and to lower the manufacturing cost.

On the other hand, as to the flashing device in which the light regulation level is adjusted by adjusting the reference voltage with the variable resistor, it is necessary to manually adjusting the reference value of the variable resistor and to set the reference voltage to a certain voltage corresponding to the photosensitivity of the light receiving circuit. Thus, it takes a long operation time for adjustment so that operation efficiency becomes worse. Moreover, there is a limit to accuracy of the adjustment. Thus, it is difficult to perform the adjustment with great accuracy. Further, the variable resistor is comparatively expensive so that the manufacturing cost is prevented from being lowered.

As to the flashing devices in which the filter is arranged and the light regulation level is adjusted by changing the capacity of the capacitor of the light receiving circuit, the filter and the capacitor are manually exchanged and are manually added so that the adjustment can not be effectively performed. Moreover, there arise problems in that it is necessary to prepare various kinds of filters having the different densities, and in that it is necessary to prepare various kinds of capacitors having the different capacity.

SUMMARY OF THE INVENTION

In view of the foregoing, it is a primary object of the present invention to provide a flashing device in which parts of a circuit for automatically regulating the light may be reduced.

It is a second object of the present invention to provide a flashing device in which a light regulation level may be adjusted by simple structure and by using low-priced parts.

In order to achieve the above and other objects, the flashing device according to the present invention repeatedly performs flashing in a pulse state. At this time, the flash light reflected by a subject is received by a light receiving element. Based on a photocurrent flowing from the light receiving element, the received light amount is integrated. When the integrated amount reaches a value corresponding to a predetermined level, succeeding flashing is stopped. Thus, the flash-light amount may be controlled with accuracy.

Moreover, a capacitor is charged by the photocurrent flowing the light receiving element to integrate the light amount. A charging voltage of the capacitor is sampled by an A-D converter as an integral voltage. Integral voltage data obtained from the A-D converter is compared with a predetermined reference voltage data. When the integral voltage data is equal to the reference voltage data or more, flashing is stopped. Owing to this structure, a number of parts may be reduced.

Further, the photocurrent flowing from the light receiving element is converted to a light-reception voltage while flashing is performed in the pulse state. The converted one is sampled by the A-D converter. Based on light-reception voltage data obtained from the A-D converter, the flash light is integrated. Integral voltage data corresponding to the integrated amount is compared with a predetermined reference voltage data. When the integral voltage data is equal to the reference voltage data or more, flashing is stopped. Owing to this structure, a number of parts may be reduced.

In the flashing device according to another embodiment, the flash light reflected by a subject is integrated by a light receiving circuit constituted of a light receiving element and a capacitor. In this flashing device, a semiconductor switching element is connected to the light receiving element in series and is turned on and off in a certain cycle. A ratio of an on-period of the switching element to the cycle thereof is varied. By varying this ratio, photosensitivity of the light receiving circuit may be easily adjusted, using low-priced parts. Thus, a light regulation level may be adjusted so as to obtain a predetermined flash-light amount.

In the flashing device according to other embodiment, the light amount is integrated based on a photocurrent flowing from a light receiving element. A voltage corresponding to an inputted voltage-control signal is applied to the light receiving element. By changing the voltage applied to the light receiving element, photosensitivity of the light receiving circuit is easily adjusted. Thus, the light regulation level may be adjusted so as to obtain a predetermined flash-light amount.

BRIEF DESCRIPTION OF THE DRAWINGS

The above objects and advantages of the present invention will become apparent from the following detailed description of the preferred embodiments of the invention when read in conjunction with the accompanying drawings, in which.

DETAILED DESCRIPTION OF THE PREFERRED EMBODIMENT(S)

Figure 1:
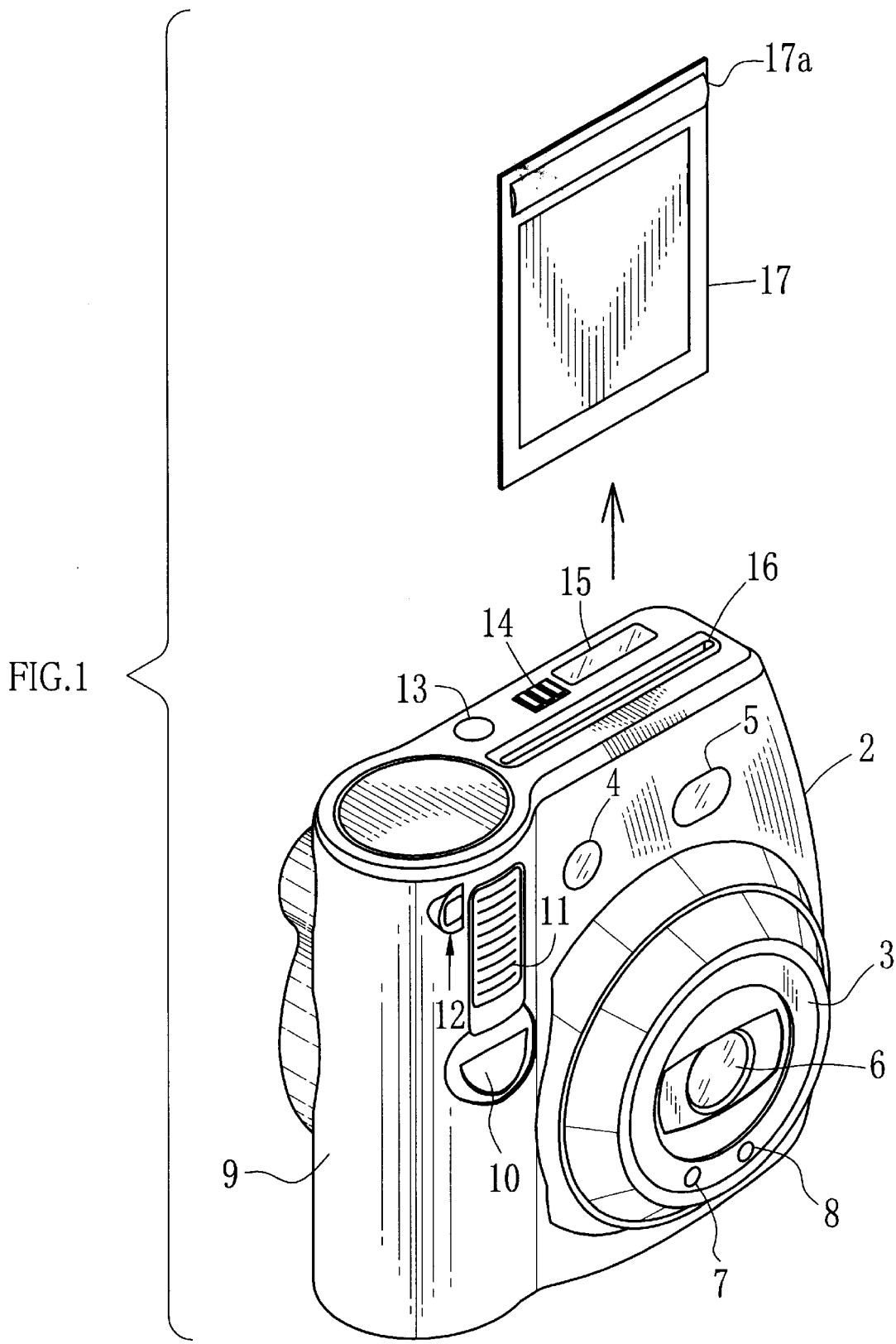
FIG. 1 is a perspective view showing an instant camera having a flashing device according to the present invention.

FIG. 1 shows an instant camera having a built-in flashing device according to the present invention. The front of a camera body 2 is provided with a lens barrel 3 of a collapsible type, a light emitting window 4, and a light receiving window 5. These windows are used for performing automatic focusing. The lens barrel 3 holds a taking lens 6. The front of the lens barrel 3 is provided with a photometry window 7 for performing photometry of subject brightness, and a flash receiving window 8. A grip portion 9 is provided with a release button 10, a higher portion of which is provided with a flash emitting unit 11 of the flashing device and a viewfinder 12. A top face of the camera body 2 is provided with a main switch button 13, a setting button 14, an LCD 15 and an outlet 16. The inside of the grip portion 9 becomes a battery chamber which is loaded with a battery (not shown) being as a power source of the instant camera.

Whenever the main switch button 13 is pressed, power supply of the instant camera is alternately turned on and off. When the power supply is turned on, the lens barrel 3 is moved, to set a photographable state, from a collapsible mount position shown in FIG. 1 to a photographic position where the lens barrel 3 protrudes. Meanwhile, when the power supply is turned off, the lens barrel 3 is returned to the collapsible mount position. In accordance with this, it becomes impossible to take a picture upon depression of the release button 10.

A light emitting unit and a light receiving unit for measuring a distance are incorporated behind the light emitting window 4 and the light receiving window 5. A light receiving element for photometry is disposed behind the photometry window 7. Moreover, a phototransistor 18 (see FIG. 2) for automatically regulating the light is disposed behind the flash receiving window 8.

When the release button 10 is depressed by half a stroke, the light for measuring a distance is emitted from the light emitting unit toward a subject. The reflected light is received by the light receiving unit to measure the subject distance. Meanwhile, subject brightness is measured by the light receiving element via the photometry window 7. Successively, the release button 10 is fully depressed. Upon this, focusing of the taking lens 6 is performed in accordance with the measured subject distance. After that, a shutter blade of a program system is operated on the basis of the measured subject brightness to expose an instant photo film 17.

When the subject brightness is equal to a predetermined level or less under an automatic flash mode, the flash light is emitted from the flash emitting unit 11 toward the subject in synchronism with the operation of the shutter blade. The flash light reflected by the subject is received by the phototransistor 18. When a received light amount reaches a prescribed level, flashing is stopped. At the time of flashing, the shutter blade is operated at a fixed shutter speed and a fixed stop value for flashing.

The exposed instant photo film 17 is extruded from the outlet 16. At this time, a developer pod 17a of the instant photo film 17 is ruptured by a pair of development rollers provided behind the outlet 16. Owing to this, developing solution contained in the developer pod 17a is developed into the instant photo film 17. In this way, a developing process necessary for the instant photo film 17 is completed, and a photo print is obtained after a set period has passed.

By handling the setting button 14, it is possible to perform various setting, for example, setting of a flash mode. The LCD 15 displays necessary information relative to photographing, for example, the flash mode, a remaining number of the instant photo films, and a remaining amount of a battery.

As to the flash mode, it is possible to select either of the automatic flash mode and a flash prohibiting mode. Under the automatic flash mode, flashing is automatically performed in synchronism with the operation of the shutter blade when the subject brightness is the predetermined level or less. Thus, the flash light is emitted from the flash emitting unit 11 toward the subject. Under the flash prohibiting mode, flashing is not performed without regard to the subject brightness.

Figure 2:
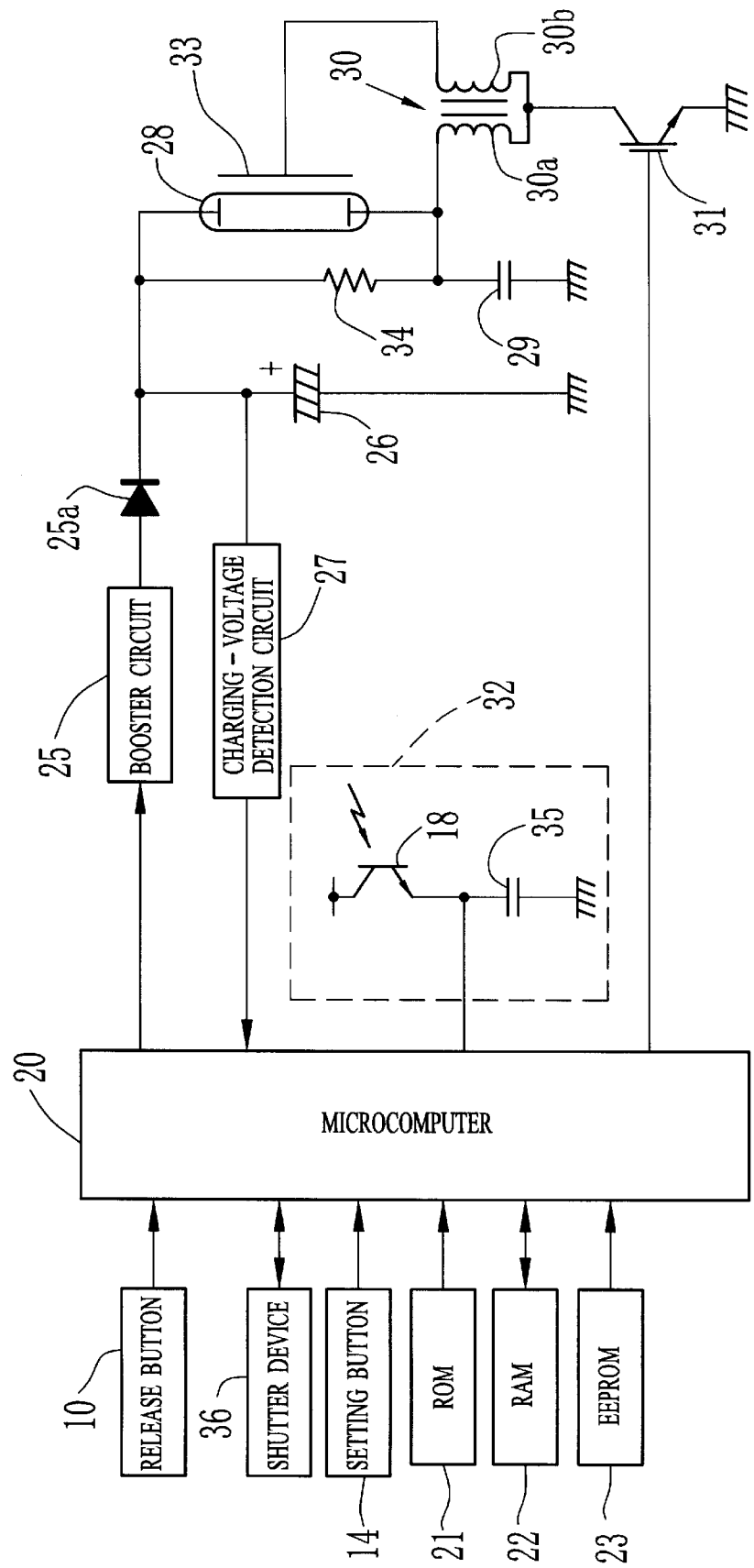
FIG. 2 is a circuit diagram showing the flashing device.

FIG. 2 partially shows a structure of the instant camera. A microcomputer 20 is a chip in which a CPU, an interface, an A-D converter and so forth are integrated. The interface performs input-output of signals and data relative to the respective sections. The A-D converter is described later. The microcomputer 20 is connected to a ROM 21, a RAM 22, an EEPROM 23 and so forth.

The microcomputer 20 controls the whole operation of the instant camera in accordance with a sequence program stored in the ROM 21. The RAM 22 is utilized as a work memory in which data for executing the sequence is temporarily written. In the EEPROM 23, data $D_{REF1}$ of a reference voltage described later is written at the time of manufacturing.

The flashing device is constituted of a booster circuit 25, a main capacitor 26, a charging-voltage detection circuit 27, a flash discharge tube 28, trigger capacitor 29, a trigger coil 30, an IGBT (insulation-gate type bipolar transistor) 31, a light receiving circuit 32, and so forth. Flashing is controlled by the microcomputer 20.

The booster circuit 25 is activated while a charge signal is inputted from the microcomputer 20. The booster circuit 25 converts a low voltage of the battery to an alternating high voltage to output it. The alternating voltage outputted from the booster circuit 25 is rectified by a rectifier diode 25a and is supplied to the main capacitor 26 to charge it. The rectifier diode 25a is arranged between the booster circuit 25 and the main capacitor 26 such that a cathode of the rectifier diode 25a is adapted to be connected with a plus side of the main capacitor 26.

The microcomputer 20 detects a charging voltage of the main capacitor 26 on the basis of a detection voltage which is outputted from the charging-voltage detection circuit 27 connected to the main capacitor 26. When the charging voltage reaches a prescribed charging voltage, sending the charge signal is stopped to finish charging the main capacitor 26. When the charging voltage of the main capacitor 26 is lowered rather than the prescribed charging voltage due to natural discharge and so forth, the microcomputer 20 starts to send the charge signal again. In virtue of this, the charging voltage of the main capacitor 26 is substantially kept at the prescribed charging voltage.

The prescribed charging voltage is set so as to be considerably higher than a minimum flashing voltage necessary for flashing the flash discharge tube 28. The reason for this is as follows. When the flash is emitted in a pulse state such as described later in detail, it is necessary for the stable flash to perform flashing in a state that the charging voltage of the main capacitor 26 is equal to the minimum flashing voltage or more.

The flash discharge tube 28 is arranged in the flash emitting unit 11. One end of the flash discharge tube 28 is connected to a plus side of the main capacitor 26, and the other end thereof is connected to one end of a primary coil 30a of the trigger coil 30. The other end of the primary coil 30a is connected to a collector terminal of the IGBT 31. An emitter terminal of the IGBT 31 is grounded to be connected to a minus side of the main capacitor 26. A gate terminal of the IGBT 31 is connected to the microcomputer 20. As to a secondary coil 30b of the trigger coil 30, one end thereof is connected to a trigger electrode 33 provided near the flash discharge tube 28, and the other end thereof is connected to the collector terminal of the IGBT 31.

One end of the trigger capacitor 29 is connected to the cathode of the rectifier diode 25a via a resistance 34, and the other end thereof is grounded. Moreover, the above-noted end of the trigger capacitor 29 is connected to one end of the primary coil 30a.

The trigger capacitor 29 is charged, together with the main capacitance 26, by an output current of the booster circuit 25. IGBT 31 is repeatedly turned on and off in a short cycle during one exposure when the flash signal is inputted from the microcomputer 20 to the gate terminal of the IGBT. While the IGBT 31 is turned on, the flash discharge tube 28 is connected to the main capacitor 26 to emit the flash light. Since the IGBT 31 is repeatedly turned on and off, the flash discharge tube 28 repeatedly flashes in the pulse state during one exposure. In other words, the flashing device is set in an intermittent operation mode. Incidentally, hereinafter, stepping flash means the flash light which is emitted in the pulse state while the IGBT 31 is turned on.

The trigger capacitor 29 lets a discharge current flow in the primary coil 30a when the IGBT 31 is turned on at the outset every exposure. When the discharge current flows in the primary coil 30a, a trigger voltage of several kV is generated in the secondary coil 30b. The trigger voltage is applied to the flash discharge tube 28 via the trigger electrode 33. Upon applying the trigger voltage, the flash discharge tube 28 discharges the electric charge of the main capacitor 26 while internal insulation of the flash discharge tube 28 is broken and the IGBT 31 is turned on. In this way, the first stepping flash is performed.

The succeeding stepping flash is performed by turning on the IGBT 31 in a state that the flash discharge tube 28 is activated owing to the last stepping flash. Thus, the succeeding stepping flash is performed only by turning on the IGBT 31 for connecting the flash discharge tube 28 to the main capacitor 26, without applying the trigger voltage to the flash discharge tube 28.

As described above, the primary coil 30a of the trigger coil 30 is arranged between the flash discharge tube 28 and the main capacitor 26. By such a structure, the primary coil 30a works as a choke coil so that the light amount of the stepping flash is considerably prevented from increasing at the beginning of flashing. In the present invention, flashing is intermittently performed. In virtue of this, it is possible to control a flash-light amount so as to avoid over-exposure, even if a subject distance is short and the reflectance of a subject is high. In this way, by making the primary coil 30a work as the choke coil, the flash-light amount may be controlled more effectively to avoid the over-exposure. Incidentally, the choke coil may be separately provided. It is needless to say that a number of parts increases if so.

The light receiving circuit 32 is constituted of the above-mentioned phototransistor 18 and a capacitor 35. A fixed voltage is applied to a collector terminal of the phototransistor 18. One end of the capacitor 35 is connected to an emitter terminal of the phototransistor 18, and the other end thereof is grounded. The light receiving circuit 32 outputs a charging voltage of the capacitor 35 being as a integral voltage $V_{Cph}$ to the microcomputer 20.

The phototransistor 18 receives the flash light reflected by a subject, and lets a photocurrent flow in accordance with an amount of the received flash light. The capacitor 35 is charged by the photocurrent. As charging is performed, the charging voltage of the capacitor 35, namely the integral voltage $V_{Cph}$ is raised. The light receiving circuit 32 receives the flash light reflected by the subject to integrate the light amount. Then, the integral voltage $V_{Cph}$ is outputted in accordance with the integrated light amount.

When the release button 10 is depressed by half a stroke, the microcomputer 20 measures the subject distance with the light emitting unit and the light receiving unit used for measuring the distance. At the same time, the microcomputer 20 measures the subject brightness with the light receiving element used for photometry. Successively, when the release button 10 is fully depressed, the microcomputer 20 actuates a shutter device 36 after focusing of the taking lens 6 has been performed in accordance with the obtained subject distance. In case the subject brightness is a predetermined level or less under the automatic flash mode, the shutter blade is operated at a shutter speed and at a stop value for flashing.

A synchronizing signal, which is a commencement signal for starting the flash, is sent from the shutter device 36 to the microcomputer 20 in synchronism with the operation of the shutter blade. Upon this, the microcomputer 20 begins to send the flash signal to start flashing. The microcomputer 20 executes the A-D conversion relative to the integral voltage $V_{Cph}$ while flashing is performed. The converted integral voltage is monitored. When it is detected that the integral voltage $V_{Cph}$ has reached a predetermined voltage, the flash signal is stopped to be sent so that flashing is stopped.

Figure 3:
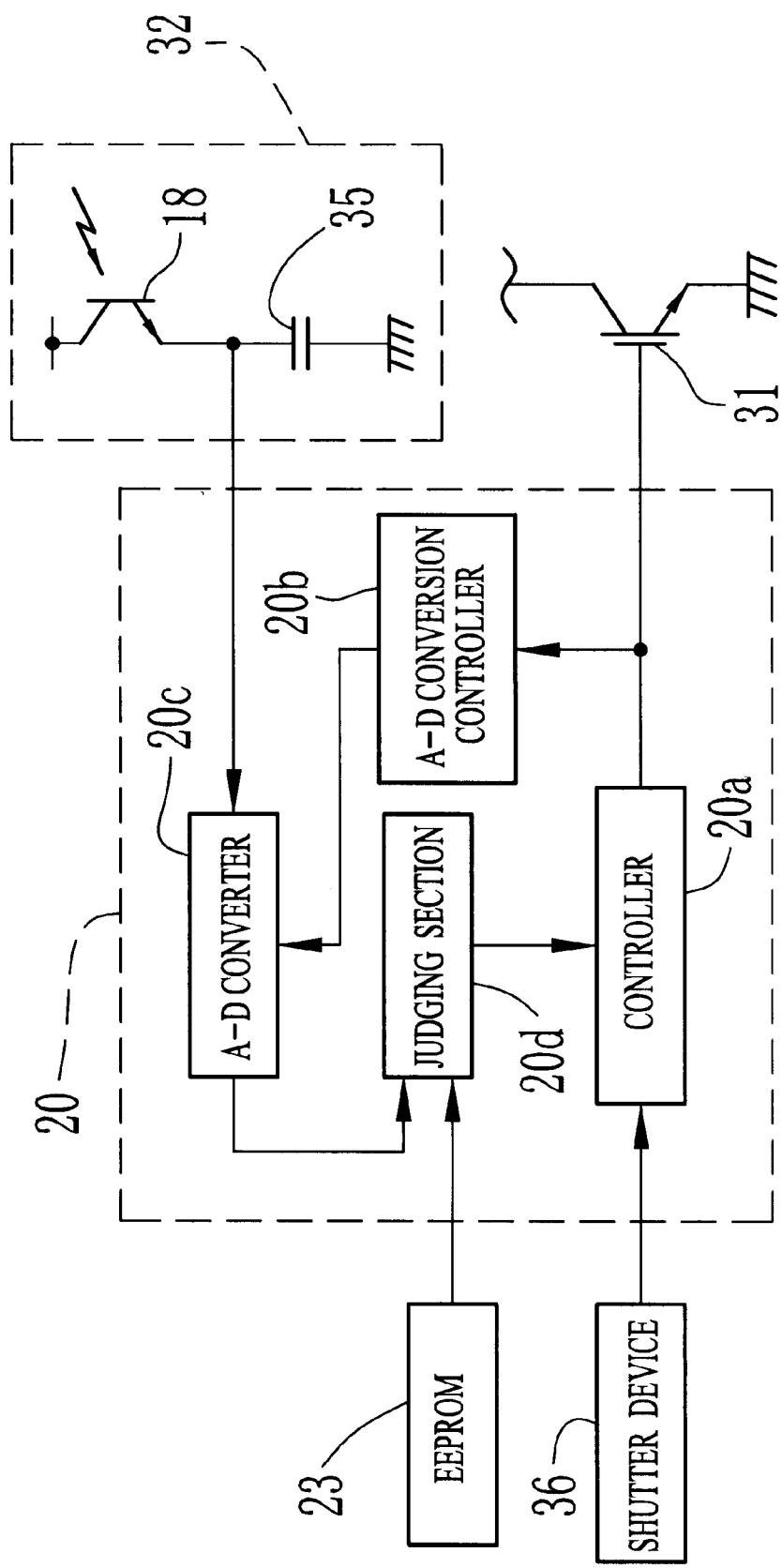
FIG. 3 is a block diagram showing a function of a microcomputer.

FIG. 3 shows a block diagram of the microcomputer 20. The microcomputer 20 works as a controller for turning on and off the IGBT 31. Besides this, the microcomputer 20 works as a light regulator together with the light receiving circuit 32. A controller 20a starts to send the flash signal in response to the synchronizing signal inputted from the shutter device 36. The IGBT 31 is turned on and off for the respective periods at the time of flashing. The flash signal is stopped to be sent when a stop signal is inputted. Upon this, the IGBT 31 is continuously turned off. In other words, the flashing device is set in a non-operation mode.

The IGBT 31 is turned on while the flash signal is "H level", namely while an on-signal is inputted. The IGBT 31 is turned off while the flash signal is "L level", namely while an off-signal is inputted. Thus, the IGBT 31 is turned on during an on-period which is identical with a pulse width (period) $T_{on}$ of the on-signal. The IGBT 31 is turned off during an off-period which is identical with a pulse width (period) $T_{off}$ of the off-signal. Incidentally, commencement of sending the flash signal means commencement of outputting the on-signal and the off-signal. Moreover, stopping the flash signal means continuously outputting the off-signal.

The pulse width $T_{on}$ of the on-signal and the pulse width $T_{off}$ of the off-signal are fixed. Thus, the flash signal having a fixed cycle and a fixed duty factor is given to the IGBT 31. When the flash signal having the fixed cycle and the fixed duty factor is given to the IGBT 31, the light amount of the individual stepping flash tends to increase at the beginning of the flash, as a number of the stepping flash increases. After the light amount of the stepping flash has reached the peak, the light amount of the individual stepping flash tends to decrease. This tendency is considered to be caused by a change of an activation state in the flash discharge tube 28 and by a change of the charging voltage of the main capacitor 26, for example.

In case the pulse widths $T_{on}$ and $T_{off}$ are changed, the light amount of the individual stepping flash is changed, even if the activation state of the flash discharge tube 28 is fixed and the charging voltage of the main capacitor 26 is fixed. This phenomenon is confirmed as a result of experiment by the inventors of this application. Concretely, the light amount of the individual stepping flash decreases as the pulse width $T_{on}$ decreases or the pulse width $T_{off}$ increases. On the contrary, the light amount of the individual stepping flash increases as the pulse width $T_{on}$ increases or the pulse width $T_{off}$ decreases.

In view of the above-mentioned light amount of the individual stepping flash, the respective pulse widths $T_{on}$ and $T_{off}$ are properly adjusted in advance. For example, the pulse width $T_{on}$ is adjusted to "7 $\mu s$", and the pulse width $T_{off}$ is adjusted to "40 $\mu s$". Moreover, the stepping flash is properly performed by certain times so as to correspond to full flashing when the shutter blade is operated. For example, the stepping flash is performed in "3 ms" by times corresponding to full flashing.

An A-D conversion controller 20b monitors a signal level of the flash signal to control sampling performed by an A-D converter 20c which is incorporated in the microcomputer 20. When the flash signal is changed from "H level" to "L level", the A-D conversion controller 20b instructs the A-D converter 20c to perform sampling.

Into the A-D converter 20c, the integral voltage $V_{Cph}$ is inputted from the light receiving circuit 32. The A-D converter 20c performs sampling of the integral voltage $V_{Cph}$ upon receiving the instruction of sampling. An obtained voltage value is digitally converted to integral voltage data $D_{Cph}$ and is sent to a judging section 20d.

The judging section 20d compares the integral voltage data $D_{Cph}$ with data $D_{REF1}$ of the reference voltage whenever the integral voltage data $D_{Cph}$ is inputted. When the data $D_{Cph}$ is equal to the data $D_{REF1}$ or more, the stop signal is sent to the controller 20a. Judging sequence is executed from the commencement of sampling performed by the A-D converter 20c to the judgement by the judging section 20d. This sequence is completed within the duration that the flash signal is "L level".

By the way, sampling by the A-D converter 20c may be performed during the stepping flash. In this case, however, the integral voltage $V_{Cph}$ is sampled during an increase thereof so that the sampled integral voltage $V_{Cph}$ becomes smaller than the integral voltage $V_{Cph}$ obtained after completion of the stepping flash. Thus, there is a high possibility to cause the over-exposure, because the extra stepping flash is emitted. In view of this, when sampling is performed during the stepping flash, it is desirable to approach the sampling timing as near as possible to the timing for completing the stepping flash. Of course, as stated above, it is preferable to perform sampling just after the completion of the stepping flash. In this case, the flash-light amount can be controlled with greater accuracy.

The reference voltage data $D_{REF1}$ is determined such that the integral voltage $V_{Cph}$ outputted from the light receiving circuit 32 is equal to the voltage data converted by the A-D converter 20c at a juncture that flashing is performed and a normal exposure amount is given to the instant photo film 17. Further, the reference voltage data $D_{REF1}$ is determined, taking account an error of the light receiving circuit 32. Accordingly, the instant camera has the reference voltage data $D_{REF1}$ being respectively different.

Owing to this, when the flash-light amount reaches the level for giving the normal exposure amount to the instant photo film 17, the stop signal is sent to the controller 20a. In response to the stop signal, the flash signal is stopped to be sent so that the succeeding stepping flash is prohibited and flashing for one exposure is finished.

By the structure described above, a number of parts may be reduced and the flash-light amount may be controlled without using a voltage comparator and so forth.

Meanwhile, in case flashing is continuously performed, flashing is also continued while the digital data is compared. At this time, the digital data obtained by A-D conversion of the integral voltage outputted from the light receiving circuit is compared with the predetermined digital data to determine stop timing of flashing. In this case, an incidence-light amount of the instant photo film increases, because flashing is continued while the digital data are compared. Thus, in order to properly finish the flashing, it is necessary to complete the judging sequence in an extremely short period and to repeat it in an extremely short cycle. For this reason, the A-D converter and the microcomputer whose processing speeds are extremely high are required so that increasing the cost is not avoided. When the computer and so forth have the slow processing speed, the over-exposure is caused. Especially, when a subject distance is short or the reflectance of a subject is high, the over-exposure is caused.

However, in the present flashing device, flashing is intermittently performed, and the integral voltage $V_{Cph}$ is checked every completion of the stepping flash to determine whether the next stepping flash is performed or not. Thus, even if the low-priced A-D converter 20c and the microcomputer 20 having the comparatively low processing speed are adopted, it is possible to control the flash-light amount with accuracy and to prevent the over-exposure.

Owing to the structure in which the light amount is integrated by using the capacitor 35, the microcomputer 20 does not need to integrate the light amount. Thus, it is possible to adopt the A-D converter 20c and the microcomputer 20 having the lower processing speed. In virtue of this, it is possible to further reduce the cost.

Instead of incorporating the A-D converter 20c in the microcomputer 20, the A-D converter 20c may be externally attached. However, when the A-D converter 20c is built in the microcomputer 20, the circuit of the microcomputer 20 merely needs to be changed without altering its producing process. In this case, the producing cost is hardly increased. Thus, it is advantageous on reducing the cost that the A-D converter 20c is built in the microcomputer 20.

When flashing is finished in the above-described structure, the integral voltage data $D_{Cph}$ is smaller than the reference voltage data $D_{REF1}$. Even if a difference between them is small, the next stepping flash is sometimes performed to cause the over-exposure. Especially, at the beginning of flashing wherein the light amount of the stepping flash tends to increase, there is a high possibility to cause the great over-exposure. In order to prevent this problem, even if the integral voltage data $D_{Cph}$ does not reach the reference voltage data $D_{REF1}$, flashing may be finished in case the difference is small, for example, in case the integral voltage data $D_{Cph}$ reaches 95% of the reference voltage data $D_{REF1}$.

Figure 4:
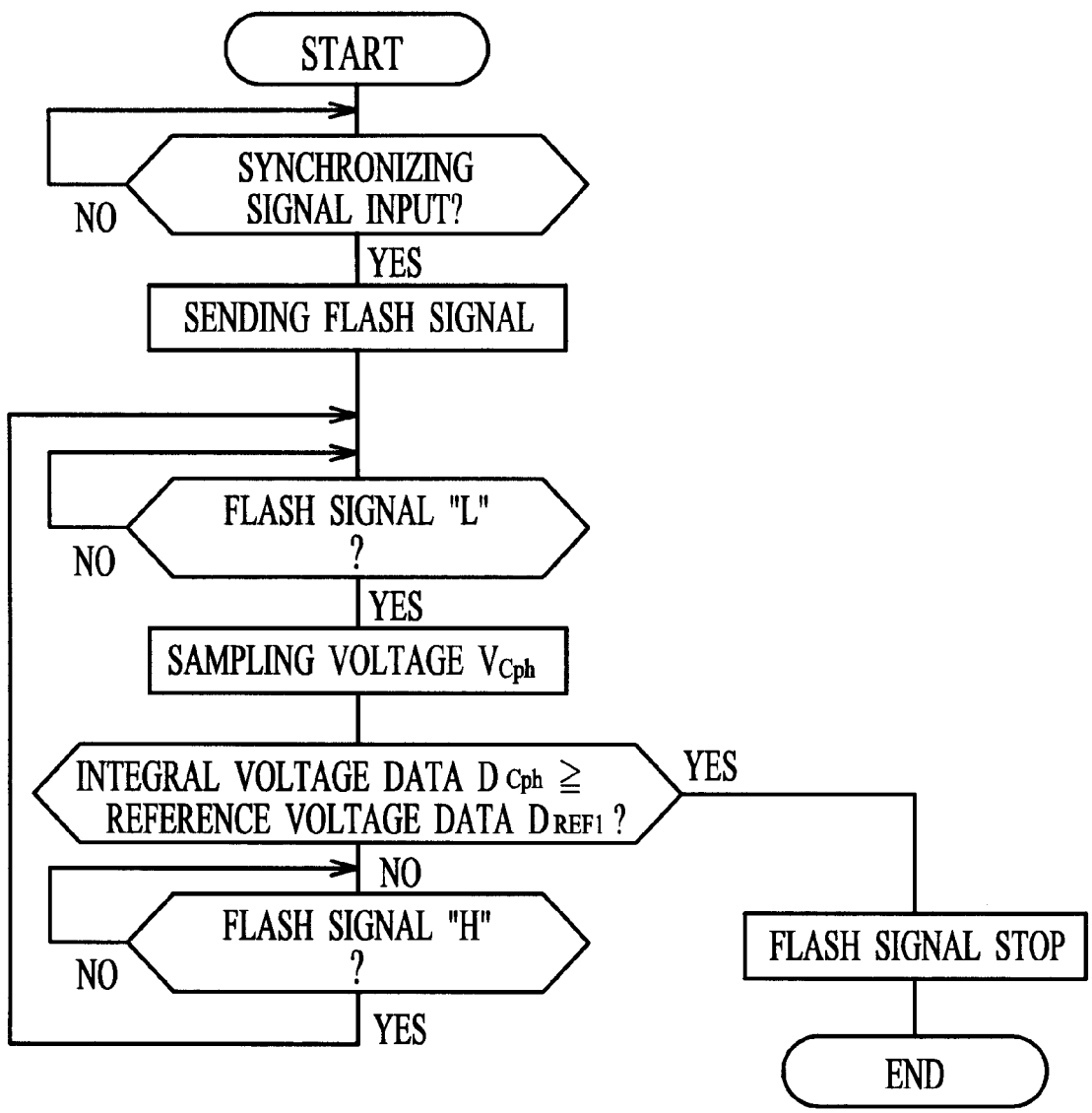
FIG. 4 is a flow chart showing a flashing sequence.
Figure 5:
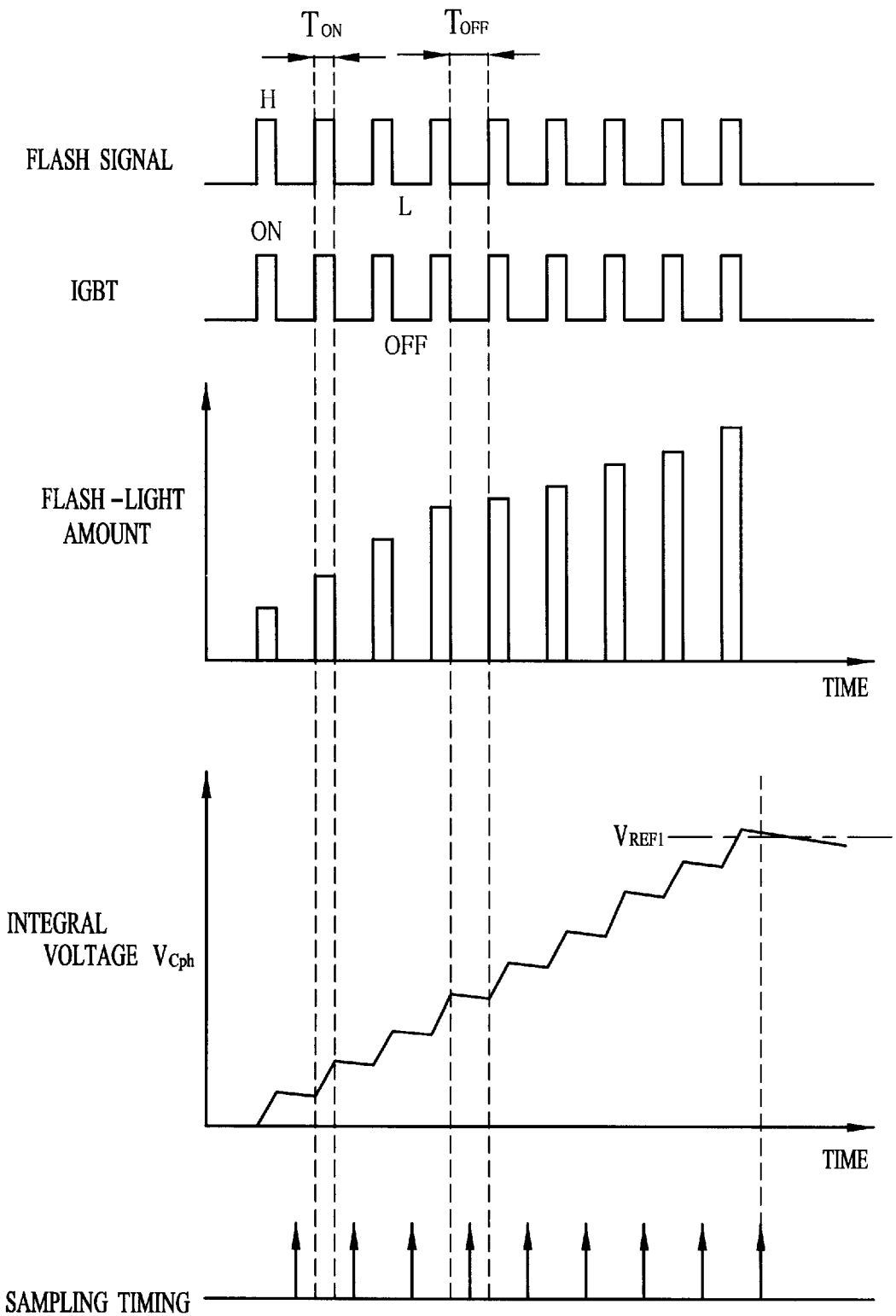
FIG. 5 is a timing chart for explaining a flashing operation.

Referring to FIGS. 4 and 5, an operation of the above structure is described bellow. When the main switch button 13 is handled to turn on the power source of the instant camera, a collapsing mechanism which is not shown is actuated to protrude the lens barrel 3 toward the photographic position. Then, the instant camera is set in a waiting state capable of photographing. In this state, the microcomputer 20 monitors the charging voltage of the main capacitor 26 on the basis of the detection voltage outputted from the charging-voltage detection circuit 27. When the charging voltage of the main capacitor 26 does not reach the prescribed charging voltage, the booster circuit 25 is activated to perform charging.

Owing to this, while the power source is turned on, the charging voltage of the main capacitor 26 is substantially kept at the prescribed charging voltage, and a flashable state is always set. Meanwhile, the trigger capacitor 29 is simultaneously charged when the main capacitor 26 is charged. Incidentally, when the flash prohibiting mode is selected by handling the setting button 14, charging may be stopped despite the charging voltage of the main capacitor 26.

When the release button 10 is depressed by half a stroke, a subject distance is measured with the light emitting unit and the light receiving unit for measuring the distance. Moreover, subject brightness is measured with the light receiving element for photometry.

For example, when the subject brightness is the predetermined level or less under the automatic flash mode, the reference voltage data $D_{REF1}$ is read from the EEPROM 23 to be set in the judging section 20d.

Successively, when the release button 10 is fully depressed, focusing of the taking lens 6 is performed in accordance with the obtained subject distance. After that, the shutter device 36 is actuated to operate the shutter blade at the shutter speed and the stop for flashing. In synchronism with the operation of the shutter blade, the synchronizing signal is inputted into the controller 20a of the microcomputer 20.

The controller 20a starts to send the flash signal in response to the inputted synchronizing signal. When the flash signal of "H level", namely the on-signal is inputted into the IGBT 31, this IGBT 31 is turned on. A period during which the IGBT 31 is turned on is identical with the pulse width $T_{on}$ of the on-signal.

When the IGBT 31 is turned on by the first on-signal, the charged trigger capacitor 29 lets the discharge current flow in the primary coil 30a. Upon the discharge current flowing in the primary coil 30a, the trigger voltage generated at the secondary coil 30b is applied to the flash discharge tube 28. Owing to this, the internal insulation of the flash discharge tube 28 is broken. Then, while the IGBT 31 is turned on, the electric charge of the main capacitor 26 is discharged to emit the flash light. The flash light emitted from the flash discharge tube 28 is radiated toward the subject by the flash emitting unit 11. In this way, the first stepping flash is performed.

The flash light of the first stepping flash is reflected by the subject, and a part thereof enters the phototransistor 18 through the flash receiving window 8. Upon this, the phototransistor 18 lets the photocurrent corresponding to an incidence-light amount flow. By this photocurrent, the capacitor 35 is charged. Thus, the integral voltage $V_{Cph}$ is raised.

After that, the flash signal is set to the "L level". When the first off-signal is inputted into the IGBT 31, the IGBT 31 is turned off to cut the connection between the flash discharge tube 28 and the main capacitor 26. Upon this, emitting the flash light is stopped, and the first stepping flash is finished.

Moreover, when the flash signal is set to the "L level", the A-D conversion controller 20b sends the instruction of sampling to the A-D converter 20c. Based on the instruction, the A-D converter 20c performs sampling of the integral voltage $V_{Cph}$ outputted from the light receiving circuit 32. Further, the A-D converter 20c converts the integral voltage $V_{Cph}$ to the integral voltage data $D_{Cph}$ and sends it to the judging section 20d.

When the integral voltage data $D_{Cph}$ from the A-D converter 20c is inputted into the judging section 20d, this judging section 20d compares the integral voltage data $D_{Cph}$ with the reference voltage data $D_{REF1}$ to judge the relationship between them. In this judgment, when the integral voltage data $D_{Cph}$ is equal to the reference voltage data $D_{REF1}$ or more, the judging section 20d sends the stop signal to the controller 20a to stop the flash signal. However, when the integral voltage data $D_{Cph}$ is smaller than the reference voltage date $D_{REF1}$, the stop signal is not sent.

As described above, the judging sequence is executed from the commencement of sampling performed by the A-D converter 20c to the judgment performed by the judging section 20d. This sequence is completed within the period (pulse width) $T_{off}$ of the off-signal, and it is decided whether the stop signal is sent or not by the timing for inputting the second on-signal into the IGBT 31.

For example, in the case that the integral voltage data $D_{Cph}$ is smaller than the reference voltage data $D_{REF1}$, the stop signal is not inputted into the controller 20a. Thus, when the period $T_{off}$ passes after the flash signal has been turned to the "L level", the flash signal is set to the "H level" again and the second on-signal having the pulse width $T_{on}$ is inputted into the IGBT 31.

When the IGBT 31 is turned on by the second on-signal, the flash discharge tube 28, which is kept in a state activated by the first stepping flash, is connected to the main capacitor 26. Upon this, the electric charge of the main capacitor 26 is discharged again in the flash discharge tube 28, and the flash light is emitted from the flash discharge tube 28 to start the second stepping flash. Successively, the flash signal is set to the "L level" after the second on-signal and the second off-signal is inputted into the IGBT 31. Owing to this, the IGBT 31 is turned off to finish the second stepping flash.

Similarly to the first stepping flash, a part of the light reflected by the subject enters the phototransistor 18 during the second stepping flash. Then, the photocurrent flows in accordance with the flash-light amount having entered the phototransistor 18. By this photocurrent, the capacitor 35 is charged. The integral voltage $V_{Cph}$ is raised by an extent corresponding to the incidence-light amount of the instant photo film 17. Hence, the integral voltage $V_{Cph}$ is set to a value corresponding to the incidence-light amount of the instant photo film 17 relative to the first and second stepping flashes. Strictly speaking, the capacitor 35 discharges during an interval between the first and second stepping flashes so that the integral voltage $V_{Cph}$ is slightly lowered.

When the flash signal is set to the "L level" after secondarily turning on the IGBT 31, sampling is performed by the A-D converter 20c similarly to the foregoing. At the moment that the second stepping flash has been finished, the integral voltage $V_{Cph}$ is converted to the integral voltage data $D_{Cph}$ to be sent to the judging section 20d. Successively, the judgement is performed by the judging section 20d. Also in this judgement, when the integral voltage data $D_{Cph}$ is equal to the reference voltage data $D_{REF1}$ or more, the stop signal is sent to the controller 20a to stop the flash signal. However, when the integral voltage data $D_{Cph}$ is smaller than the reference voltage data $D_{REF1}$, the stop signal is not sent.

Similarly, the flash signal is continued to be sent until the integral voltage data $D_{Cph}$ reaches the reference Voltage data $D_{REF1}$. The third stepping flash and the succeeding stepping flash are performed in order. Of course, in case the integral voltage data $D_{Cph}$ reaches the reference voltage data $D_{REF1}$ when the second stepping flash has been finished, the stop signal is sent at that time to stop the flash signal.

For example, the judging sequence is executed just after the Nth stepping flash has been performed by the Nth on-signal and while the Nth off-signal is inputted into the IGBT 31. In this sequence, when it is detected that the integral voltage data $D_{Cph}$ reaches the reference voltage data $D_{REF1}$, namely that the integral voltage $V_{Cph}$ reaches the reference voltage $V_{REF1}$ corresponding to the normal exposure amount, the stop signal is sent from the judging section 20d to the controller 20a at that time. Upon this, the controller 20a continuously outputs the off-signal as the Nth off-signal. Thus, the (N+1)th stepping flash and the succeeding stepping flash are not performed so that flashing of one exposure is finished.

As a result, the instant photo film 17 is exposed by the flash light emitted in the stepping flashes of N times. The normal exposure amount is almost applied to the instant photo film 17.

The exposed instant photo film 17 is extruded from the outlet 16. At the time of excretion, developing solution is developed inside the instant photo film 17. In virtue of this, a necessary process for developing the instant photo film 17 is completed, and a photo print is obtained after a predetermined period has passed.

Figure 6:
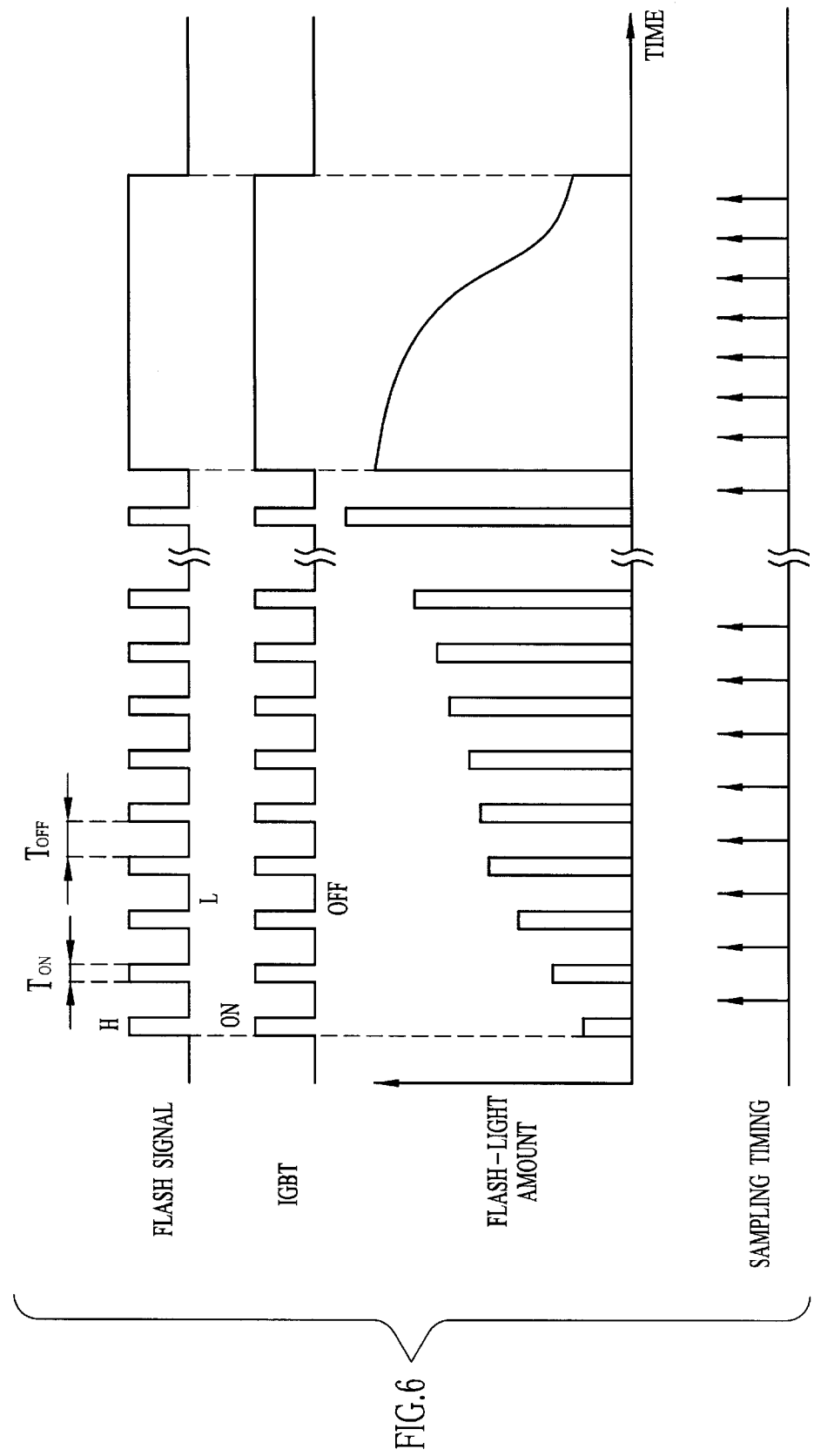
FIG. 6 is a timing chart showing an example of successive flash after stepping flash performed in a pulse state.

In the above embodiment, the stepping flash is repeated through the one-exposure period. However, as shown in FIG. 6, successive flashing may be performed after the stepping flash has been repeated at the beginning of flashing. In the following description, a constituting member which is substantially identical with that of the above embodiment is denoted by the same reference numeral, and detailed explanation thereof is omitted.

In this embodiment, the controller 20a gives a predetermined number of the on-signals to the IGBT 31 so as to repeat the stepping flash. After that, the flash signal is continuously set to the "H level" so as to successively perform flashing. In other words, the on-signal is continuously inputted into the IGBT 31 to successively turn on the IGBT 31. Owing to this, successive flash is performed after a predetermined period has passed from the commencement of flashing. In other words, the flashing device is set in a continuous operation mode.

While the stepping flash is repeated, the judging sequence is executed just after the stepping flash whenever the stepping flash is performed. Meanwhile, while the flash signal is continuously set to the "H level", the A-D converter 20c is controlled by the A-D conversion controller 20c to perform sampling of the integral voltage $V_{Cph}$ at fixed intervals. The judging section 20d makes the judgment every sampling of the integral voltage $V_{Cph}$.

During the successive flash, the judging sequence is executed from sampling of the integral voltage $V_{Cph}$ to the judgment by the judging section 20d. This sequence is repeated at fixed intervals. When the integral voltage data $D_{Cph}$ reaches the reference voltage data $D_{REF1}$, the flash signal is set to the "L level" to finish flashing. Of course, in case the integral voltage data $D_{Cph}$ reaches the reference voltage data $D_{REF1}$ while the stepping flash is repeated, flashing is finished at that time. Thus, the successive flash is not performed.

Timing for changing the stepping flash to the successive flash is determined based on a changing pattern of the flash-light amount and so forth. The timing is determined as a period from the commencement of flashing until a juncture that an increase of the exposure amount becomes gradual.

As described above, when the flash signal having the fixed cycle and the fixed duty factor is given to the IGBT 31, the light amount of the individual stepping flash tends to increase, as the number of the stepping flashes increases at the beginning of flashing. After that, the light amount of the individual stepping flash tends to decrease. Under such a tendency, an exposure value (EV) of the flash light applied to the instant photo film 17 suddenly increases at the beginning of flashing. After the light amount of the stepping flash has reached the peak, namely in the latter half of flashing, although the exposure value increases, an increasing rate thereof lowers. Thus, the exposure value is adapted to gradually increase.

Such phenomenon that the increasing rate of the exposure value lowers is similarly caused in the case that the stepping flash is repeatedly performed at the beginning of flashing and the IGBT 31 is continuously turned on in the latter half to perform the successive flash.

While the judging sequence is executed during the successive flash, flashing is continuously performed. Thus, flashing is adapted to be stopped after reaching the normal exposure amount. However, when changing to the successive flash is carried out at the timing wherein the increase of the exposure value becomes gradual, the increase of the exposure value caused by delay of the timing is small, even if the timing for stopping the flash is slightly delayed. Thus, even if the judging sequence is executed at fixed intervals during the successive flash, light regulation accuracy having no problem may be substantially obtained.

At the time of changing to the successive flash, the electric charge of the main capacitor 26 is almost discharged by the flash discharge tube 28. Thus, it is possible to obtain a sufficient amount of the flash light by using the main capacitor 26 having a smaller capacity in comparison with the case for merely performing the stepping flash.

It is necessary to determine the timing for changing to the successive flash such that changing to the successive flash is performed when the charging voltage of the main capacitor 26 is equal to the minimum flashing voltage of the flash discharge tube 28 or more. It is necessary, in order to perform the stable successive flash, that the charging voltage of the main capacitor 26 is equal to the minimum flashing voltage of the flash discharge tube 28 or more. Meanwhile, a delay of the timing for stopping the flash is changed in accordance with an execution period and a cycle of the judging sequence. Moreover, the increase of the exposure value is also changed in accordance with the delay of the timing. Thus, it is necessary to determine the timing for changing from the stepping flash to the successive flash so as not to be affected by the increase of the exposure value, taking account of the execution period and the cycle of the judging sequence. Of course, in view of the delay of the timing, the reference voltage data $D_{REF1}$ used in the successive flash may be adapted to be smaller than that in the stepping flash.

In the above embodiment, passage of the set period for changing from the stepping flash to the successive flash is detected by utilizing the predetermined cycle of the flash signal and upon completion of sending the predetermined number of the on-signals. However, the period from the commencement of flashing may be measured by a timer, and changing to the successive flash may be performed when the measured period has reached a prescribed period. Moreover, the timing for changing to the successive flash may be determined on the basis of a number of the sent on-signals, namely a frequency of turning on the IGBT 31.

Further, since there is a relationship between the exposure value of the flash light and the integral voltage $V_{Cph}$, it is possible to determine the timing for changing to the successive flash on the basis of the integral voltage $V_{Cph}$, namely the integral voltage data $D_{Cph}$.

Figure 7:
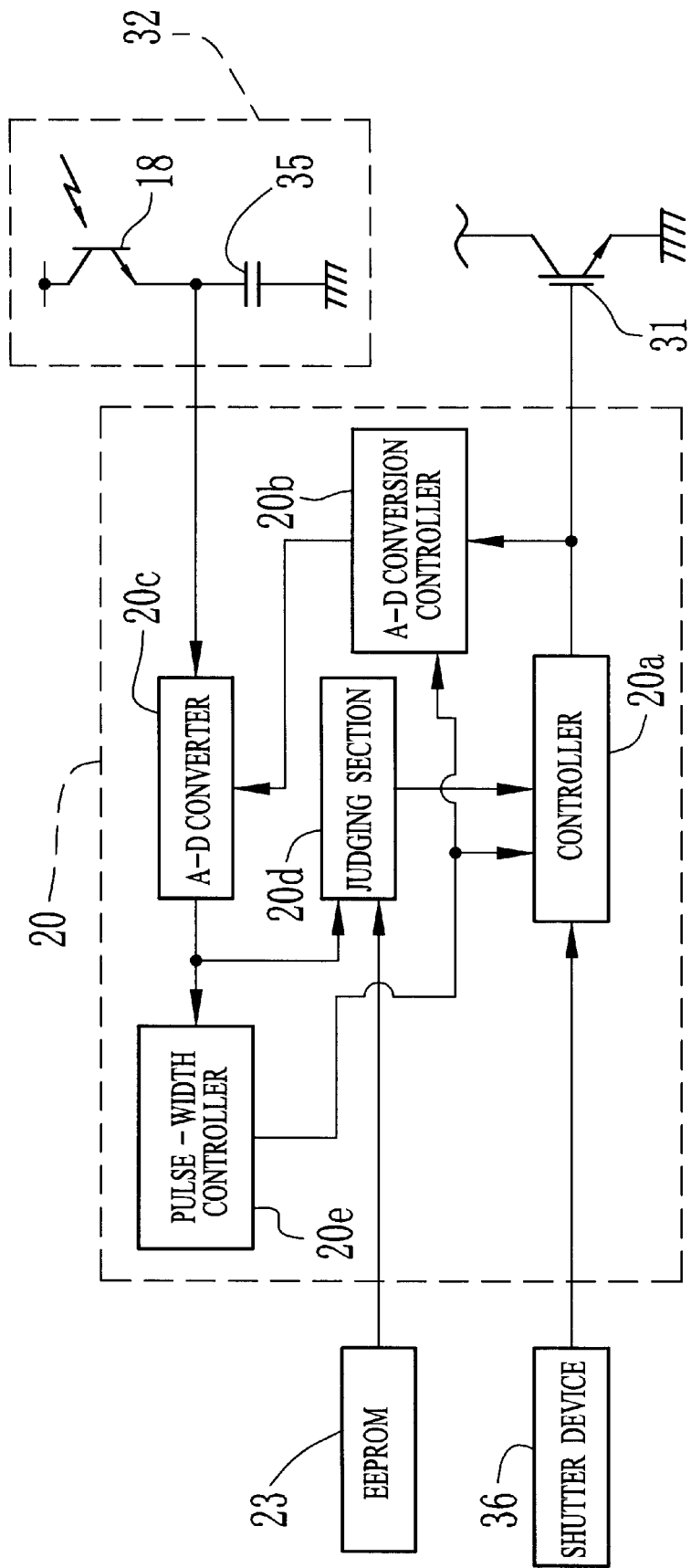
FIG. 7 is a block diagram of the microcomputer showing an example in which changing to the successive flash is performed at timing based on integral voltage data.

FIG. 7 is a block diagram of the microcomputer 20 showing an embodiment in which changing to the successive flash is performed based on the integral voltage data $D_{Cph}$. Incidentally, a circuit of the flashing device is identical with the circuit shown in FIG. 2. A member in FIG. 7 which is substantially identical with that in FIG. 3 is denoted by the same reference numeral. Although there is a difference that the microcomputer 20 performs changing to the successive flash on the basis of the integral voltage data $D_{Cph}$, the other points are similar to the embodiment shown in FIG. 6, for example, relative to the timing for sampling the integral voltage $V_{Cph}$ and so forth.

In FIG. 7, while the stepping flash is repeated, a pulse-width controller 20e calculates a difference between the current integral voltage data $D_{Cph}$ and the last integral voltage data $D_{Cph}$. The current integral voltage data $D_{Cph}$ is outputted from the A-D converter 20c every stepping flash. The last integral voltage data $D_{Cph}$ has been outputted at the last time. When the difference lowers to a predetermined value, the pulse-width controller 20e instructs the controller 20a to continuously output the on-signal. Upon this instruction, the controller 20a sets the flash signal to the "H level" to perform the successive flash until the stop signal is inputted from the judging section 20d. Owing to this, changing to the successive flash is performed when the integral voltage $V_{Cph}$, namely the increase of the exposure value has become gradual. Moreover, the instruction for continuously outputting the on-signal is given from the pulse-width controller 20e to the controller 20a. In response to this instruction, the A-D conversion controller 20b controls the A-D converter 20c so as to perform sampling of the integral voltage $V_{Cph}$ at the fixed intervals.

In this embodiment, changing to the successive flash is performed based on the increase of the integral voltage data $D_{Cph}$. However, this is not exclusive. Changing to the successive flash may be performed based on, for example, a ratio of the current integral voltage date $D_{Cph}$ to the last integral voltage data $D_{Cph}$, a size of the integral voltage data $D_{Cph}$, a difference between the increases of the current integral voltage data $D_{Cph}$ and the last integral voltage data $D_{Cph}$, and a ratio thereof.

Figure 8:
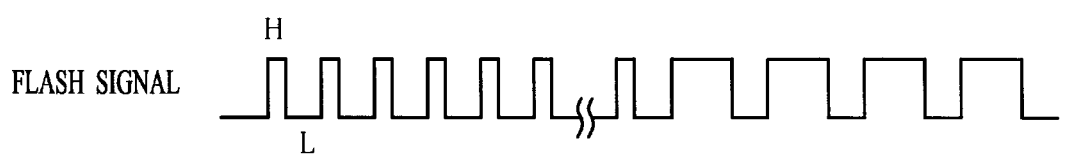
FIG. 8 is a wave form chart showing an example in which a pulse width of a flash signal is changed.

FIG. 8 shows an embodiment in which the pulse width $T_{on}$, namely the on-period of the IGBT 31 is changed, instead of changing to the successive flash on the basis of the integral voltage data $D_{Cph}$. In this embodiment, the on-signal whose pulse width $T_{on}$ is relatively narrow at the beginning of the flash is inputted into the IGBT 31. At the same time, the integral voltage data $D_{Cph}$ is monitored by the pulse-width controller 20e similarly to the embodiment shown in FIG. 7. When it is detected that the increase of the exposure value of the flash light has become gradual, the pulse width $T_{on}$ of the on-signal is widened in comparison with that of the beginning of flashing.

In the embodiment shown in FIG. 8, the on-period (the pulse width $T_{on}$) is changed in two steps. However, the on-period may be changed in three steps or more. Otherwise, the on-period may be successively changed. Instead of extending the on-period, the pulse width $T_{off}$ of the off-signal may be shortened to shorten the off-period of the IGBT 31. Of course, both of the on-period and the off-period may be changed.

Figure 9:
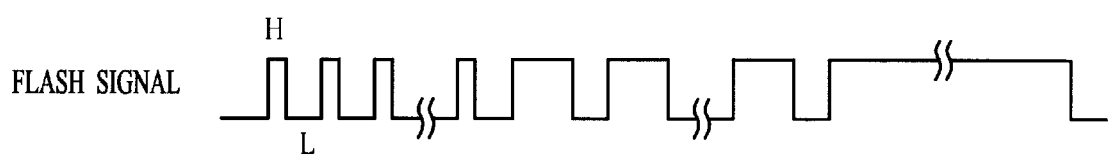
FIG. 9 is a wave form chart showing an example in which changing to the successive flash is performed after the pulse width of the flash signal has been changed.

Further, the successive flash may be performed by continuously outputting the on-signal after the flash signal has been changed so as to extend the on-period, such as shown in FIG. 9. Of course, the successive flash may be performed by continuously outputting the on-signal after the flash signal has been changed so as to shorten the off-signal. Incidentally, in the instance that the successive flash is stably performed, it is necessary to change to the successive flash in a state that charging voltage of the main capacitor 26 is equal to the minimum flashing voltage of the flash discharge tube 28 or more.

In the respective embodiments shown in FIGS. 8 and 9, the on-period and the off-period of the IGBT 31 are changed based on the integral voltage data $D_{Cph}$. However, instead of the integral voltage data $D_{Cph}$, the on-period and the off-period may be changed based on a period from the commencement of flashing, and based on a number of turning on the IGBT 31. Otherwise, it is possible to change to the successive flash after the on-period and the off-period have been changed.

FIGS. 10 through 13 show an embodiment in which a photocurrent flowing in the light receiving element is converted to a voltage by a resistance, instead of integrating the light amount with the capacitor included in the light receiving circuit. Based on the obtained voltage, the light amount is integrated by an operation of the microcomputer. Incidentally, in the following description, a constituting member which is substantially identical with that of the first embodiment is denoted by the same reference numeral, and explanation thereof is omitted.

Figure 10:
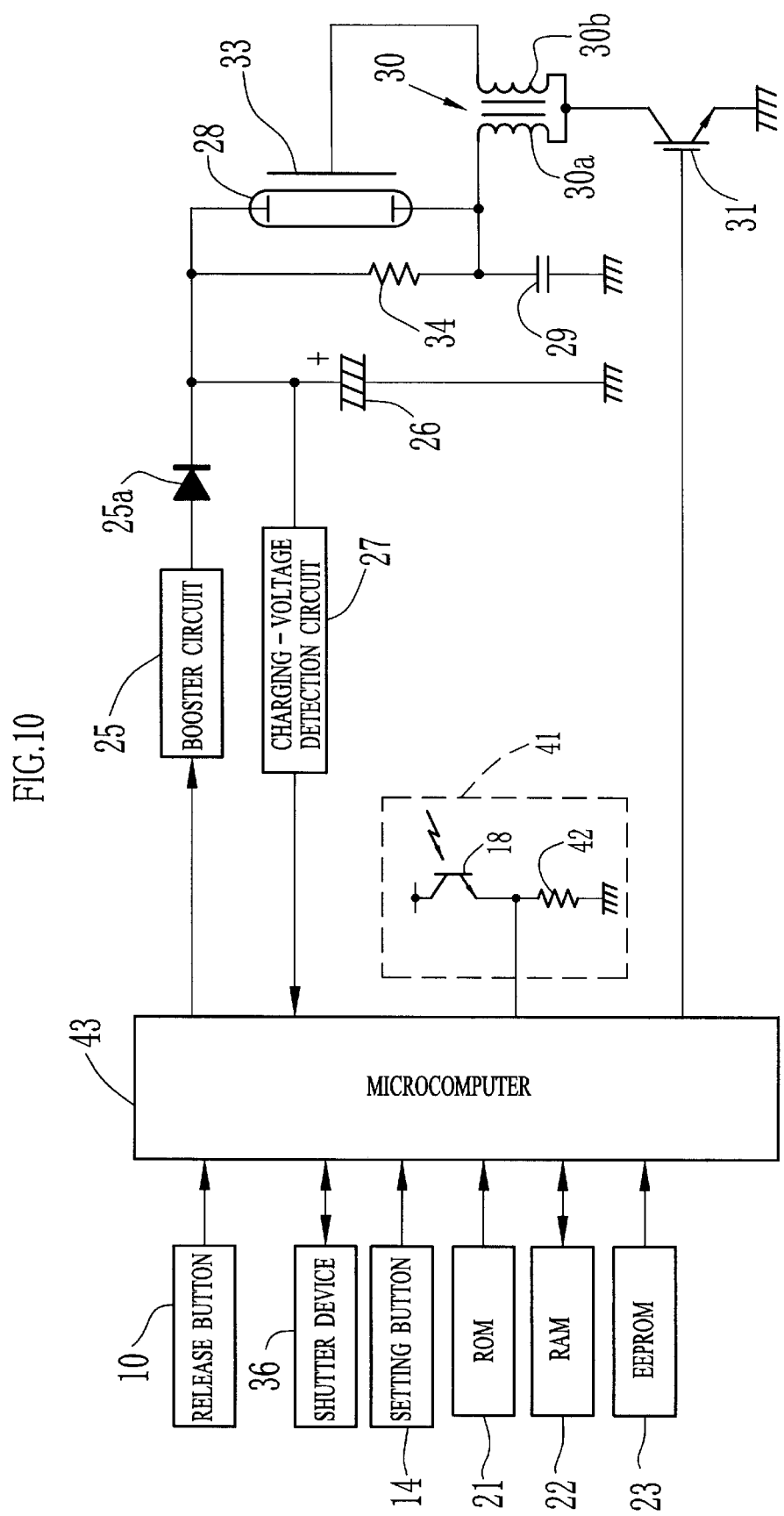
FIG. 10 is a circuit diagram of the flashing device showing an example in which an integral light-amount is calculated based on a light-reception voltage corresponding to a photocurrent.

In FIG. 10, the light receiving circuit 41 is constituted of the phototransistor 18 and a resistance 42. A fixed voltage is inputted into a collector terminal of the phototransistor 18. The resistance 42 is provided for converting a photocurrent flowing during the stepping flash to a light-reception voltage corresponding thereto. One end of the resistance 42 is connected to an emitter terminal of the phototransistor 18, and the other end thereof is grounded. During the stepping flash, the photocurrent corresponding to the light amount received by the phototransistor 18 flows in the resistance 42, and a voltage corresponding to the photocurrent is generated between both ends of the resistance 42. The light receiving circuit 41 outputs the generated voltage to the microcomputer 43 as a light-reception voltage $V_{Rph}$.

A-D conversion is carried out relative to the light-reception voltage $V_{Rph}$ obtained during the stepping flash. By using the converted one, the microcomputer 43 performs a predetermined integral operation to integrate the flash-light amount reflected by a subject. When it is detected that the obtained integral amount has reached a predetermined integral amount, the flash signal is stopped to finish flashing.

Figure 11:
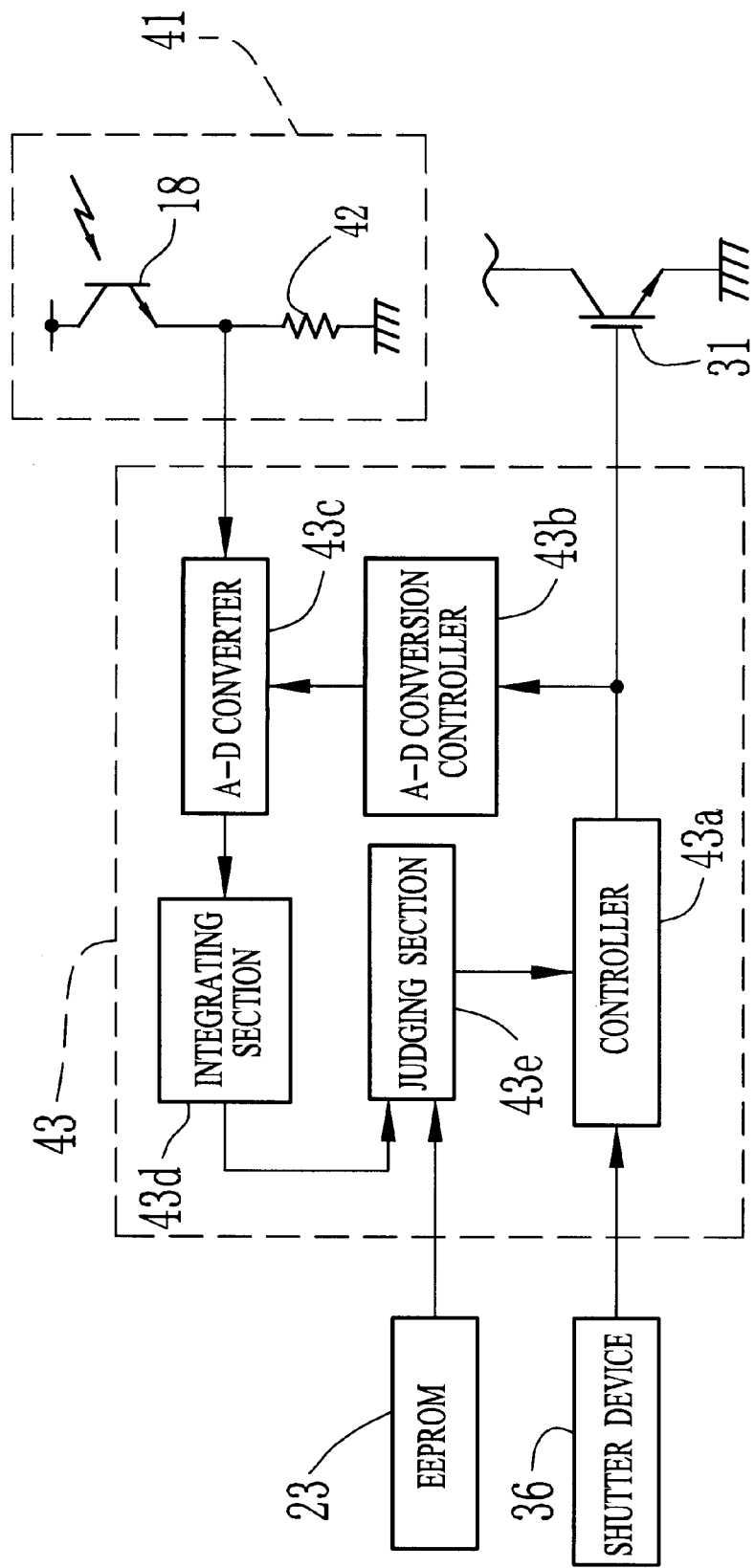
FIG. 11 is a block diagram showing a function of the microcomputer shown in FIG. 10.

FIG. 11 shows a block diagram of the microcomputer 43. A controller 43a is identical with the controller 20a of the first embodiment shown in FIG. 3. The controller 43a starts to send the flash signal in response to the input of the synchronizing signal and stops sending the flash signal upon the input of the stop signal.

An A-D conversion controller 43b monitors a signal level of the flash signal. When a predetermined period passes after the flash signal has been changed from the "L level" to the "H level", the A-D conversion controller 43b instructs a A-D converter 43c to perform sampling. Upon this, sampling is executed during the stepping flash.

The light-reception voltage $V_{Rph}$ from the light receiving circuit 41 is inputted to the A-D converter 43c. The A-D converter 43c performs sampling of the light-reception voltage $V_{Rph}$ upon the instruction from the A-D conversion controller 43b. The sampled one is digitally converted to light-reception voltage data $D_{Rph}$ and is sent to an integrating section 43d.

Whenever the light-reception voltage data $D_{Rph}$ is inputted, the integrating section 43d integrates the inputted light-reception voltage data $D_{Rph}$ by a predetermined integral operation. The flash-light amount received by the phototransistor 18 is integrated, including the stepping flash from which the inputted light-reception voltage data $D_{Rph}$ is obtained. Based on the integrated amount, integral voltage data $D_{RS}$ is calculated and is sent to a judging section 43e.

The judging section 43e compares the integral voltage data $D_{RS}$ with a reference voltage data $D_{REF2}$ whenever the integral voltage data $D_{RS}$ is inputted. When the integral voltage data $D_{RS}$ is equal to the reference voltage data $D_{REF2}$ or more, the stop signal is sent to the controller 20a. The reference voltage data $D_{REF2}$ is predetermined in view of an error of the light receiving circuit 32 such that the reference voltage data $D_{REF2}$ is adapted to be equal to the integral voltage data $D_{RS}$ obtained from the integrating section 43d, when flashing is performed and the normal exposure amount is given to the instant photo film 17. The reference voltage data $D_{REF2}$ is written in the EEPROM 23. Owing to this, when the flash-light amount reaches a level where the normal exposure amount is given to the instant photo film 17, flashing of one exposure is finished. Incidentally, similarly to the reference voltage data $D_{REF1}$ of the first embodiment, the reference voltage data $D_{REF2}$ is different relative to the respective instant cameras.

The judging sequence is executed from sampling of the light-reception voltage $V_{Rph}$ to the judgment by the judging section 43e. This sequence is executed every stepping flash and is completed within a term that the flash signal is set to the "L level". Thus, before the next on-signal is inputted into the IGBT 31, it is decided whether the stop signal is sent or not.

In the case that the light amount is integrated based on the light-reception voltage $V_{Rph}$ obtained during the stepping flash, a relationship between the integral voltage data $D_{RS}$ and an actual exposure amount is sometimes varied due to the sampling timing in the individual stepping flash, even if the stepping flash is performed under the similar condition. The reason of this is considered as follows. In the actual stepping flash, strength of the flash light is gradually increased after turning on the IGBT 31, and is suddenly changed to zero when the IGBT 31 is turned off after the strength of the flash light has reached the peak.

In order to prevent the above problem, the sampling timing of the light-reception voltage $V_{Rph}$ is fixed in the respective stepping flashes, and sampling is adapted to be performed when the strength of the flash light has reached the peak, for example. Based on this timing, is adjusted and determined the reference voltage data $D_{REF2}$ used for controlling the stop of flashing. The timing that the strength of the flash light reaches the peak can be experimentally found as a delay period which is delayed after sending the off-signal to the IGBT 31. Meanwhile, the light-reception voltage data $D_{Rph}$ may be weighted in accordance with the sampling timing to calculate the integral voltage data $D_{RS}$.

Similarly to the first embodiment, even if the integral voltage data $D_{RS}$ is less than the reference voltage data $D_{REF2}$ and the difference between them is small, the over-exposure is sometimes caused by performing the next stepping flash. Thus, even if the integral voltage data $D_{RS}$ is less than the reference voltage data $D_{REF2}$, flashing may be finished when the difference between them is small.

Figure 12:
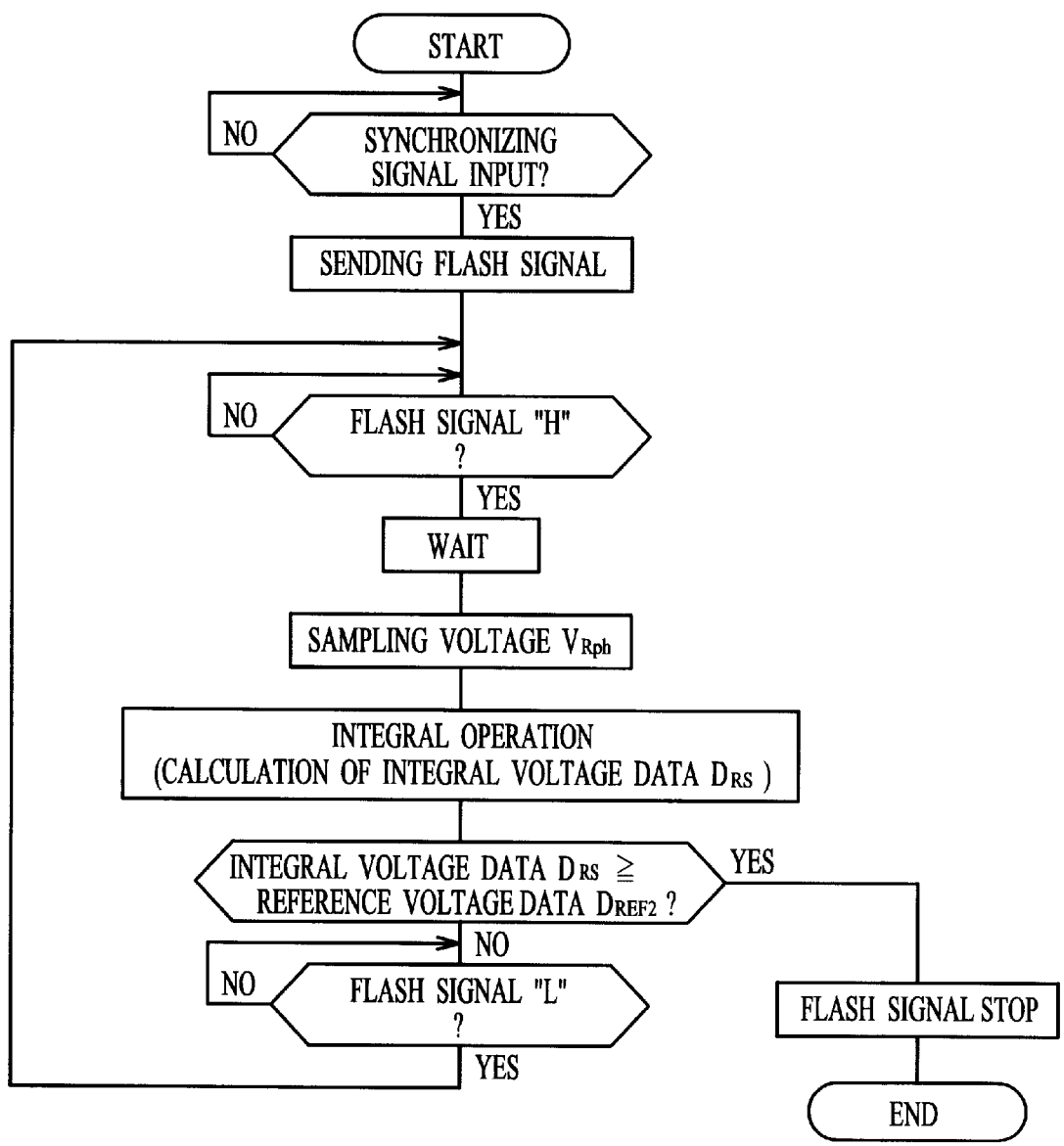
FIG. 12 is a flow chart showing a flashing sequence of the example shown in FIG. 10.
Figure 13:
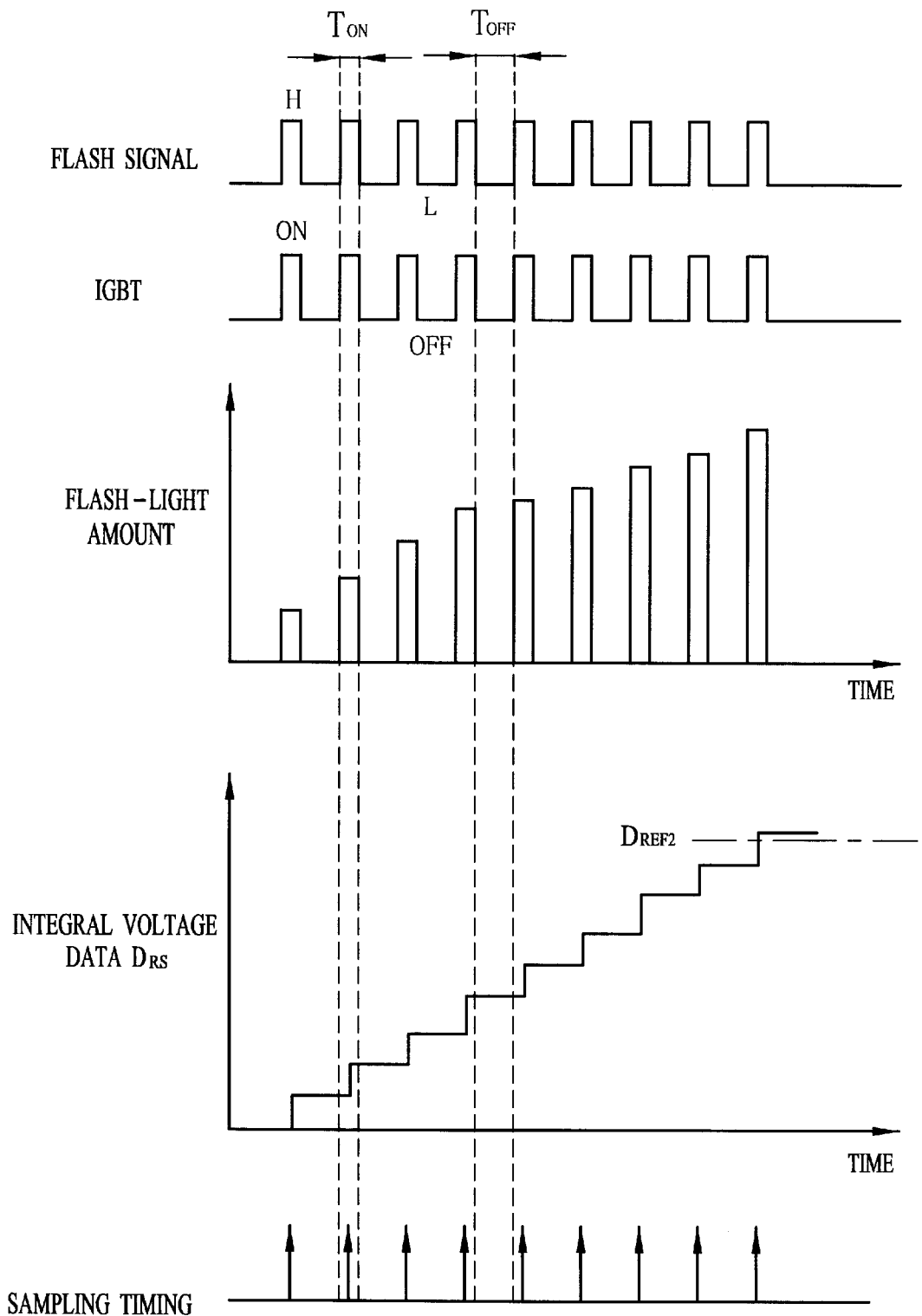
FIG. 13 is a timing chart f or explaining a f lashing operation of the example shown in FIG. 10.

According to the above structure, when the subject brightness is the predetermined level or less under the automatic flash mode, the reference voltage data $D_{REF2}$ is read from the EEPROM 23 and is set to the judging section 43e. Moreover, the synchronizing signal is inputted into the controller 43a of the microcomputer 43 in synchronism with the operation of the shutter blade. Then, as shown in FIGS. 12 and 13, when the flash signal is sent from the controller 43a in response to the input of the synchronizing signal, the IGBT 31 is turned on and off to start the stepping flash.

The first stepping flash is started by firstly turning on the IGBT 31. After that, when the IGBT 31 is turned off, the first stepping flash is finished. The flash light emitted during the first stepping flash is reflected by a subject, and a part thereof enters the phototransistor 18. In accordance with an incidence-light amount, a photocurrent flows in the resistance 42. Then, the photocurrent is converted to the corresponding light-reception voltage $V_{Rph}$ by the resistance 42 to be sent from the light receiving circuit 41.

Meanwhile, when the first stepping flash is started as stated above, namely when the flash signal is set to the "H level" at the outset, the A-D conversion controller 43b instructs the A-D converter 43c to perform sampling after a proper delay. Upon this instruction, the light-reception voltage $V_{Rph}$ outputted from the light receiving circuit 41 is sampled by the A-D converter 43c during the first stepping flash. The sampled one is converted to the light-reception voltage data $D_{Rph}$ to be sent to the integrating section 43d.

When the light-reception voltage data $D_{Rph}$ is inputted, the integrating section 43d integrates the flash-light amount received by the phototransistor 18 during the first stepping flash. The flash-light amount is integrated by applying a predetermined operation formula. Based on the integral amount, the integral voltage data $D_{RS}$ is calculated. In other words, the integral voltage data $D_{RS}$ is calculated in accordance with the exposure amount of the instant photo film 17 given by the first stepping flash. The integral voltage data $D_{RS}$ is sent to the judging section 43e.

When the integral voltage data $D_{RS}$ from the integrating section 43d is inputted into the judging section 43e, this judging section 43e compares the integral voltage data $D_{RS}$ with the reference voltage data $D_{REF2}$ to judge a relationship between them. In this judgement, when the integral voltage data $D_{RS}$ is equal to the reference voltage data $D_{REF2}$ or more, the stop signal is sent to the controller 43a to stop the flash signal. However, when the integral voltage data $D_{RS}$ is less than the reference voltage data $D_{REF2}$, the stop signal is not sent.

The judgement by the judging section 43e is completed within the period (pulse width) $T_{off}$ of the off-signal. Before the second on-signal is started to be inputted into the IGBT 31, it is decided whether the stop signal is sent or not.

When the integral data $D_{RS}$ is less than the reference voltage data $D_{REF2}$, the flash signal is set to the "H level" again after the period $T_{OFF}$ has passed from the point that the flash signal is lastly set to the "L level". Then, the second on-signal having the pulse width $T_{ON}$ is inputted into the IGBT 31. Upon turning on the IGBT 31, the second stepping flash is performed.

Similarly to the first stepping flash, a part of the flash light reflected by the subject enters the phototransistor 18 during the second stepping flash. In accordance with the incidence-light amount, the photocurrent flows. The light-reception voltage $V_{Rph}$ corresponding to the photocurrent is outputted from the light receiving circuit 41. During the second stepping flash, the light-reception voltage $V_{Rph}$ is converted to the light-reception voltage data $D_{Rph}$ by the A-D converter 43c to be sent to the integrating section 43d.

When the second light-reception voltage data $D_{Rph}$ is inputted, the integrating section 43d carries out the integral operation by using the last operation result, and calculates the integral voltage data $D_{RS}$ corresponding to the integral amount in which the integral amounts of the first and second stepping flashes are added. The integral voltage data $D_{RS}$ is sent to the judging section 43e to perform the judgement.

Similarly to the above, sending the flash signal is continued to perform the stepping flash until the integral data $D_{RS}$ reaches the reference data $D_{REF2}$. When the integral voltage data $D_{RS}$ reaches the reference data $D_{REF2}$, sending the flash signal is stopped by the stop signal outputted from the judging section 43e, and flashing of one exposure is finished. Of course, in the case that the integral voltage data $D_{RS}$ reaches the reference data $D_{REF2}$ by the first and second stepping flashes, flashing of one exposure is finished at that time.

In this way, the light amount is integrated based on the light-reception voltage $V_{Rph}$ obtained during the stepping flash, and the integral amount is checked to determine whether the next stepping flash is performed or not. Thus, although the A-D converter 43c and the microcomputer 43 adopted in the present invention have a comparatively slow processing speed and are low in price, it is possible to control the flash-light amount with accuracy so that the over-exposure may be prevented. Moreover, it is possible to control the flash-light amount by a small number of parts without using a voltage controller and so forth.

Figure 14:
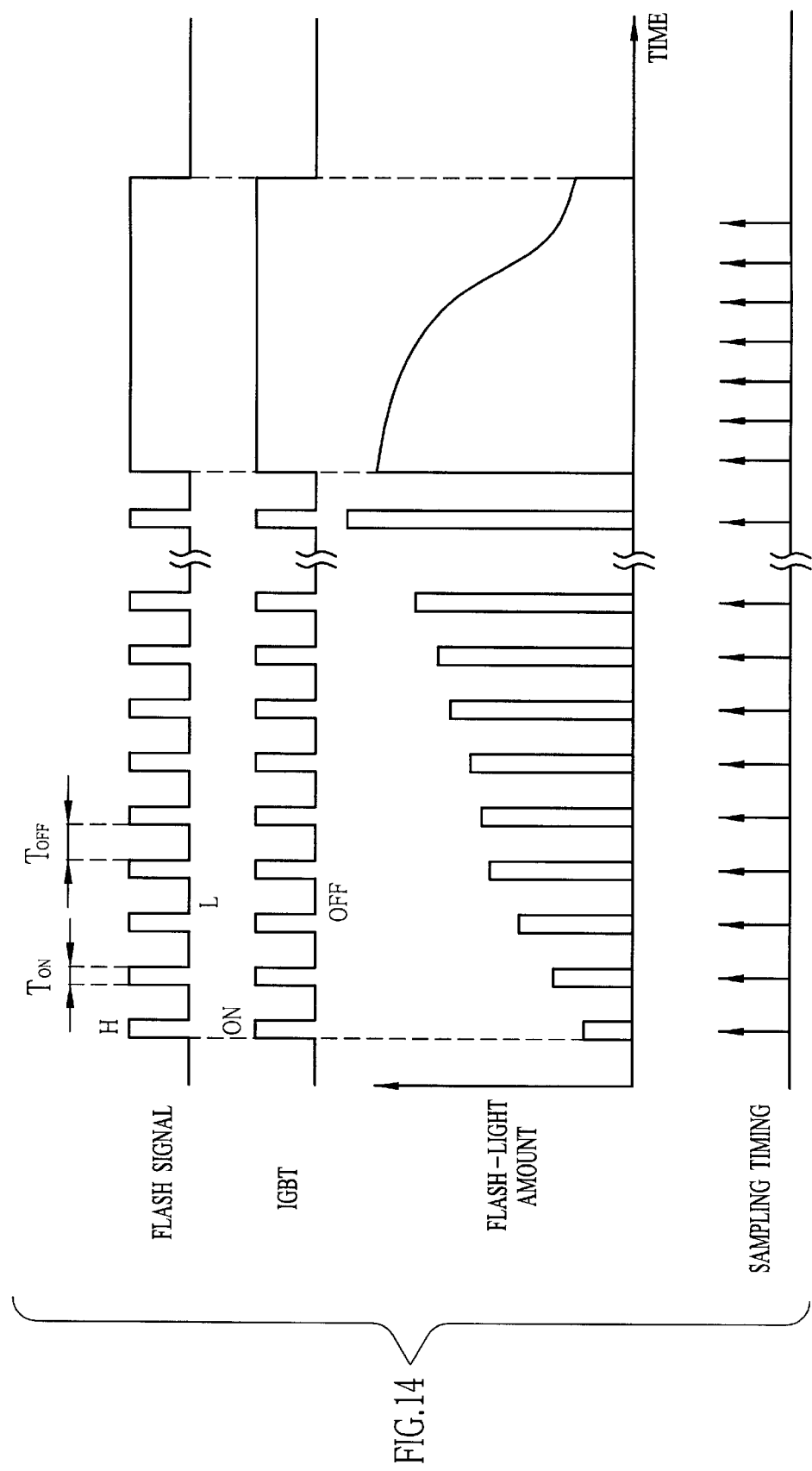
FIG. 14 is a timing chart showing an example in which the integral light-amount is calculated based on the light-reception voltage, and the successive flash is performed after the stepping f lash.

FIG. 14 shows an example in which the stepping flash is repeated, similarly to the embodiment shown in FIG. 6, in the circuit structure shown in FIG. 10. After the stepping flash, flashing is successively performed. In this embodiment, while the stepping flash is repeated by giving a predetermined number of the on-signals to the IGBT 31, the light-reception voltage $V_{Rph}$ is sampled during the stepping flash to execute the judging sequence. Meanwhile, while the flash signal is continuously set to the "H level", namely while the flashing is successively performed, the light-reception voltage $V_{Rph}$ is sampled at the fixed intervals to execute the judging sequence. When the integral voltage data $D_{RS}$ reaches the reference voltage data $D_{REF2}$, the flash signal is set to the "L level" so that flashing is finished.

In the case that light-reception voltage $V_{Rph}$ is sampled to integrate the light amount, a relationship between the obtained integral voltage data $D_{RS}$ and the actual exposure value is varied due to the sampling cycle of the light-reception voltage $V_{Rph}$ in the successive flash. Thus, it is preferable to adjust the reference voltage data $D_{REF2}$ used for controlling the stop of flashing in accordance with the sampling cycle. Moreover, the light-reception voltage data $D_{Rph}$ may be weighted in accordance with the sampling cycle to calculate the integral voltage data $D_{RS}$.

Also in the case that light-reception voltage $V_{Rph}$ is sampled to integrate the light amount, a period from the commencement of flashing may be measured by a timer, and when the measured period has reached a predetermined period, changing to the successive flash may be performed. The timing for changing to the successive flash may be determined based on a number of turning on the IGBT 31.

Figure 15:
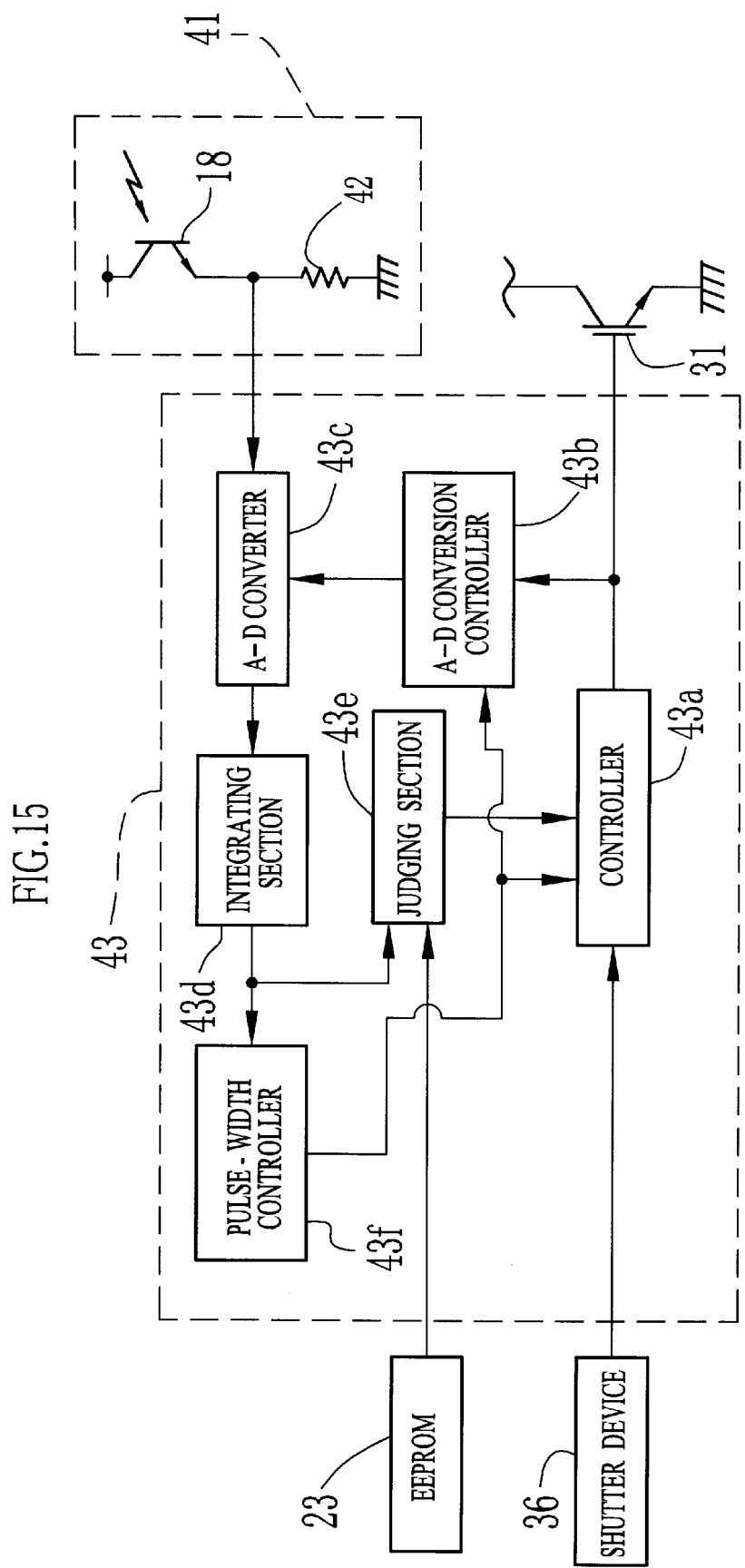
FIG. 15 is a block diagram of the microcomputer showing an example in which the integral light-amount is calculated based on the light-reception voltage, and changing to the successive flash is performed at timing based on the integral voltage data.

FIG. 15 is a block diagram of the microcomputer and shows an embodiment in which changing to the successive flash is performed based on the integral voltage data $D_{RS}$. Incidentally, the circuit of the flashing device is identical with the circuit shown in FIG. 10. In FIG. 15, a member which is substantially identical with that in FIG. 11 is denoted by the same reference numeral. Although there is a distinction relative to a point that changing to the successive flash is performed by the microcomputer on the basis of the integral voltage data $D_{RS}$, the sampling timing of the integral voltage $V_{Rph}$ and so forth are similar to the embodiment shown in FIG. 14.

In FIG. 15, a pulse-width controller 43f obtains a difference between the current integral voltage Data $D_{RS}$ and the last integral voltage data $D_{RS}$. The current integral voltage data $D_{RS}$ is outputted from the integrating means 43d while the stepping flash is repeated. When the difference lowers to a predetermined level, the controller 43a is instructed to continuously output the on-signal. Owing to this, when an increase of the integral voltage data $D_{RS}$, namely an increase of the exposure amount of the flash light becomes gradual, the on-signal is continuously outputted from the controller 43a to change to the successive flash. Moreover, when the instruction for continuously outputting the on-signal is given from the pulse-width controller 43f to the controller 43a, the A-D conversion controller 43b controls the A-D converter 43c so as to perform sampling of the integral voltage $V_{Cph}$ at a fixed intervals.

Instead of the increase of the integral voltage data $D_{RS}$, changing to the successive flash may be performed based on a ratio of the current integral voltage date $D_{RS}$ to the last integral voltage data $D_{RS}$, a size of the integral voltage data $D_{RS}$, a difference between the increases of the current integral voltage data $D_{RS}$ and the last integral voltage data $D_{RS}$, and a ratio thereof. Of course, in order to perform the stable successive flash, it is necessary to change to the successive flash in a state that the charging voltage of the main capacitor 26 is equal to the minimum flashing voltage of the flash discharge tube or more. Moreover, it is needless to say that the changing timing from the stepping flash to the successive flash is determined in view of the execution time and the cycle of the judging sequence so as not to be substantially affected by the increase of the exposure value caused by the delay of the flash stopping.

In the case that the light-reception voltage $V_{Rph}$ is sampled to integrate the light amount, changing to the successive flash may be performed based on the integral voltage data $D_{RS}$, the period from the commencement of flashing, and the number of turning on the IGBT 31. Moreover, changing to the successive flash may be performed by changing at least one of on-period and the off-period of the IGBT 31. Further, changing to the successive flash may be performed after the on-period and the off-period have been changed.

As to the case that the light-reception voltage $V_{Rph}$ is sampled to integrate the light amount, when at least one of the on-period and the off-period of the IGBT 31 is changed, a relationship between the sampled light-reception voltage $V_{Rph}$ and the obtained exposure amount is varied due to this change. Thus, it is preferable to change the sampling timing in accordance with the change of the on-period and the off-period, in order to fix the relationship between the light-reception voltage $V_{Rph}$ and the obtained exposure amount. Moreover, it is preferable to calculate the integral voltage data $D_{RS}$ by varying the weight of the light-reception voltage data $D_{Rph}$.

In the above embodiments, the on-signal and the off-signal having the fixed pulse widths $T_{ON}$ and $T_{OFF}$ are inputted at the beginning of flashing. In this case, when the IGBT 31 is turned on for several times at the outset, the stepping flash is sometimes not performed and sometimes becomes unstable. It is possible to make the stepping flash stable by widening the pulse width $T_{ON}$ of the flash signal for firstly turning on the IGBT 31, for example, up to about "20 $\mu$s".

In the above embodiments, it is described that the normal exposure amount is obtained by the flash light. However, if the reference voltage data corresponding to the exposure amount relative to the normal exposure amount is prepared and is selected in accordance with designation of the exposure amount, it is possible to adjust the flash-light amount so as to correspond to the exposure amount relative to the normal exposure amount.

FIGS. 16 through 21 show an embodiment of the flashing device in which a light-regulation level can be easily adjusted. Except the following, the circuit structure and the operation are similar to those of the first embodiment. The identical constituting member is denoted by the same reference numeral, and the description thereof is omitted.

Figure 16:
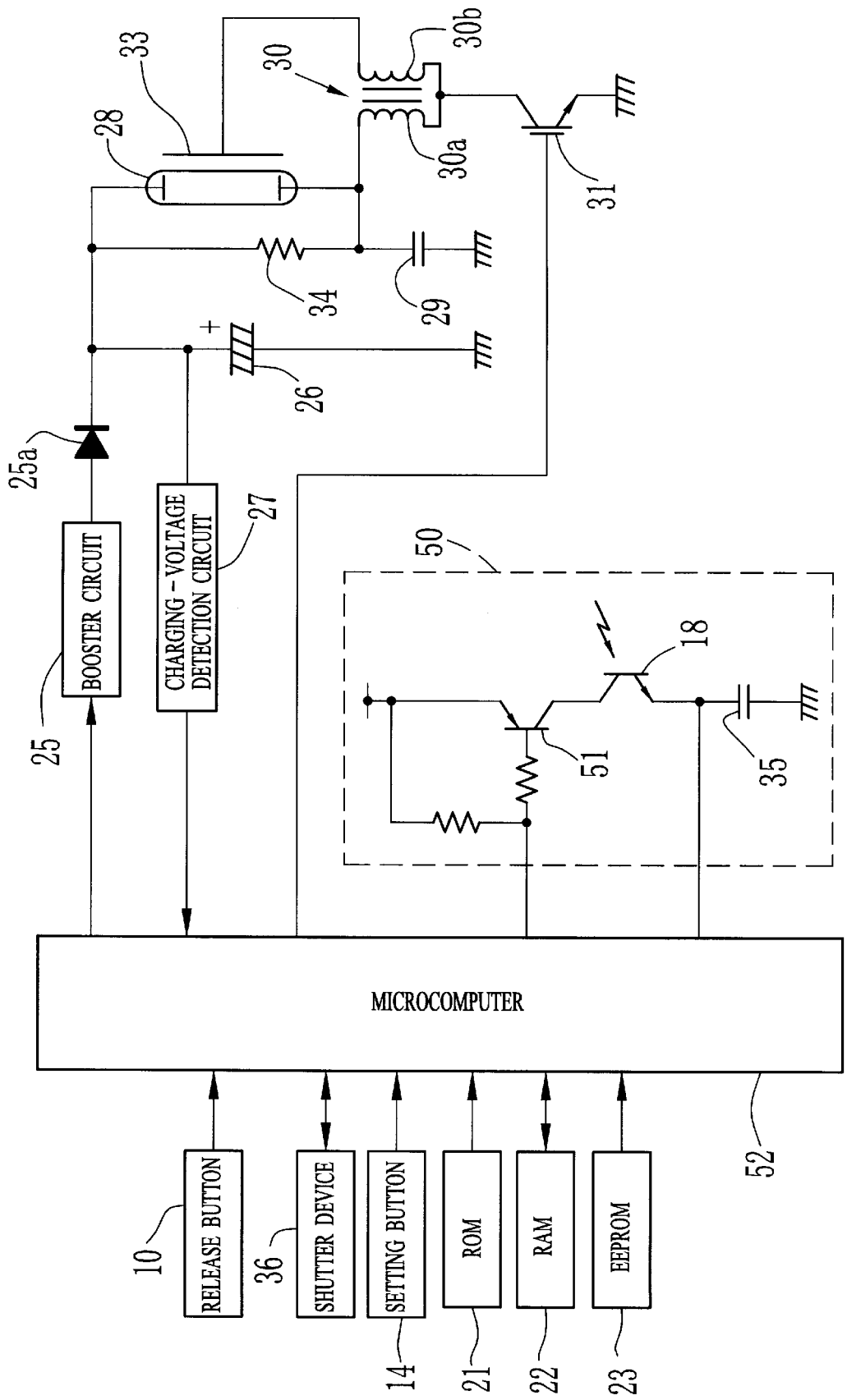
FIG. 16 is a circuit diagram of the f lashing device showing an example in which sensitivity of the light receiving circuit is adjusted by a switching element.

In FIG. 16, upon handling the setting button 14, an exposure correction mode can be selected besides the flashing mode and so forth. The selected exposure correction mode is displayed on the LCD 15. As to the exposure correction mode, it is possible to select any one of a "normal mode" in which a photo print has normal density gradation, a "light mode" in which a photo print has light density gradation, and a "dark mode" in which a photo print has dark density gradation.

In the light mode and the dark mode, exposure correction of $+\frac{2}{3}$ EV and $-\frac{2}{3}$ EV, for example, is performed relative the normal mode. The exposure correction is performed by changing a shutter speed and a stop value when the flash light is not emitted. Meanwhile, when the flash light is emitted, the exposure correction is performed by changing the flash-light amount under a condition that the shutter speed and the stop value are fixed.

Reference voltage data $D_N$, $D_L$ and $D_D$ respectively corresponding to the normal mode, the light mode and the dark mode are written in the EEPROM 23 at the time of manufacturing. Moreover, a ratio Ra used for adjusting the photosensitivity and commonly used for the respective modes are written in the EEPROM 23 at the time of manufacturing.

The reference voltage data $D_N$, $D_L$ and $D_D$ are for regulating a light level in accordance with the exposure correction mode in photographing. The data $D_N$, $D_L$ and $D_D$ are predetermined based on the photosensitivity of the designed light receiving circuit, and are common to the respective instant cameras. The reference voltage data $D_L$ and $D_D$ of the light mode and the dark mode are expressed such as the following formulas $\hat{1}$ and $\hat{2}$ by using the reference voltage data $D_N$ of the normal mode.

$$D_L = D_N \cdot 2^{dL} \qquad \hat{1}$$

$$D_D = D_N \cdot 2^{dD} \qquad \hat{2}$$

In the above formulas, the value "dL" and the value "dD" are differences of the respective exposure values (EV) in the light mode and the dark mode relative to the normal mode. In this embodiment, the dL is equal to $+\frac{2}{3}$ and the dD is equal to $-\frac{2}{3}$. Incidentally, any one of the reference voltage data, for example only the reference voltage data $D_N$ used for the normal mode may be written in the EEPROM 23. As to the other reference voltage data $D_L$ and $D_D$, calculation may be performed by the microcomputer of the instant camera to obtain them, using the reference voltage data $D_N$ of the normal mode.

Meanwhile, the ratio Ra is used for adjusting the photosensitivity of a light receiving circuit 50. In the flashing device of the instant camera, the photosensitivity of the light receiving circuit 50 is adjusted by changing the ratio Ra to make the light-regulation level proper. The ratio Ra is determined relative to the respective instant cameras at the time of manufacturing.

The light receiving circuit 50 is constituted of the phototransistor 18, the capacitor 35, and a transistor 51 used for adjusting the sensitivity. As to this transistor 51, NPN type is used. A fixed voltage is supplied to an emitter terminal of the transistor 51 by a power-supply circuit. A collector terminal of the transistor 51 is connected to the collector terminal of the phototransistor 18. A base terminal of the transistor 51 is connected to a microcomputer 52 so that the transistor 51 is turned on and off by the microcomputer 52. An emitter terminal of the phototransistor 18 is connected to one end of the capacitor 35, and the other end of the capacitor 35 is grounded.

As described latter in detail, the transistor 51 is repeatedly turned on and off while flashing is performed. The photosensitivity of the light receiving circuit 50 is adjusted by changing a ratio of the on-period Ts to a cycle T for turning on and off the transistor 51.

By connecting the transistor 51 to the phototransistor 18 in series, a fixed voltage is applied to the phototransistor 18 via the transistor 51 while the transistor 51 is turned on. A photocurrent corresponding to the received light amount flows to charge the capacitor 35. The charging voltage of the capacitor 35 is outputted from the light receiving circuit 50 to the microcomputer 52 as the integral voltage $V_{Cph}$ which corresponds to the received light amount of the phototransistor 18.

The microcomputer 52 controls the booster circuit 25, the charging-voltage detection circuit 27 and the IGBT 31, and monitors the integral voltage $V_{Cph}$ obtained from the light receiving circuit 50. Besides these, the microcomputer 52 turned on and off the transistor 51.

Figure 17:
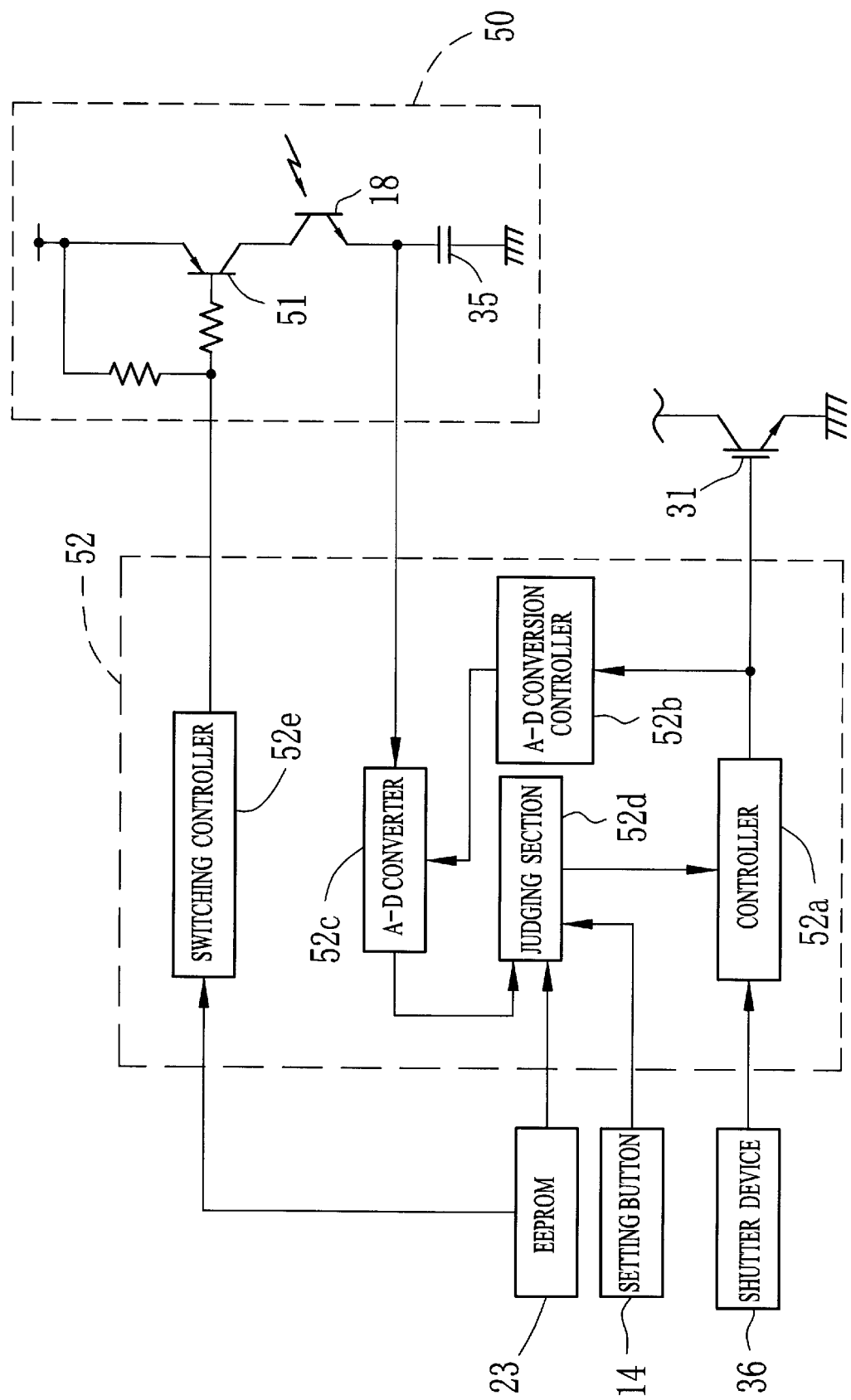
FIG. 17 is a block diagram showing a function of the microcomputer shown in FIG. 16.

FIG. 17 shows a block diagram of the microcomputer 52. A controller 52a, an A-D conversion controller 52b and an A-D converter 52c have similar functions to the controller 20a, the A-D conversion controller 20b and the A-D converter 20c of the first embodiment shown in FIG. 3. Incidentally, the A-D converter 52c linearly converts the integral voltage $V_{Cph}$ to the integral voltage data $D_{Cph}$.

Any one of the reference voltage data $D_N$, $D_L$ and $D_D$ corresponding to the exposure correction mode selected by the setting button is set to a judging section 52d as reference voltage data $D_{REF3}$. The judging section 52d compares the integral voltage data $D_{Cph}$ with the reference voltage data $D_{REF3}$ whenever the integral voltage data $D_{Cph}$ is inputted. When the former is equal to the latter or more, the stop signal is sent to the controller 52a.

Figure 18:
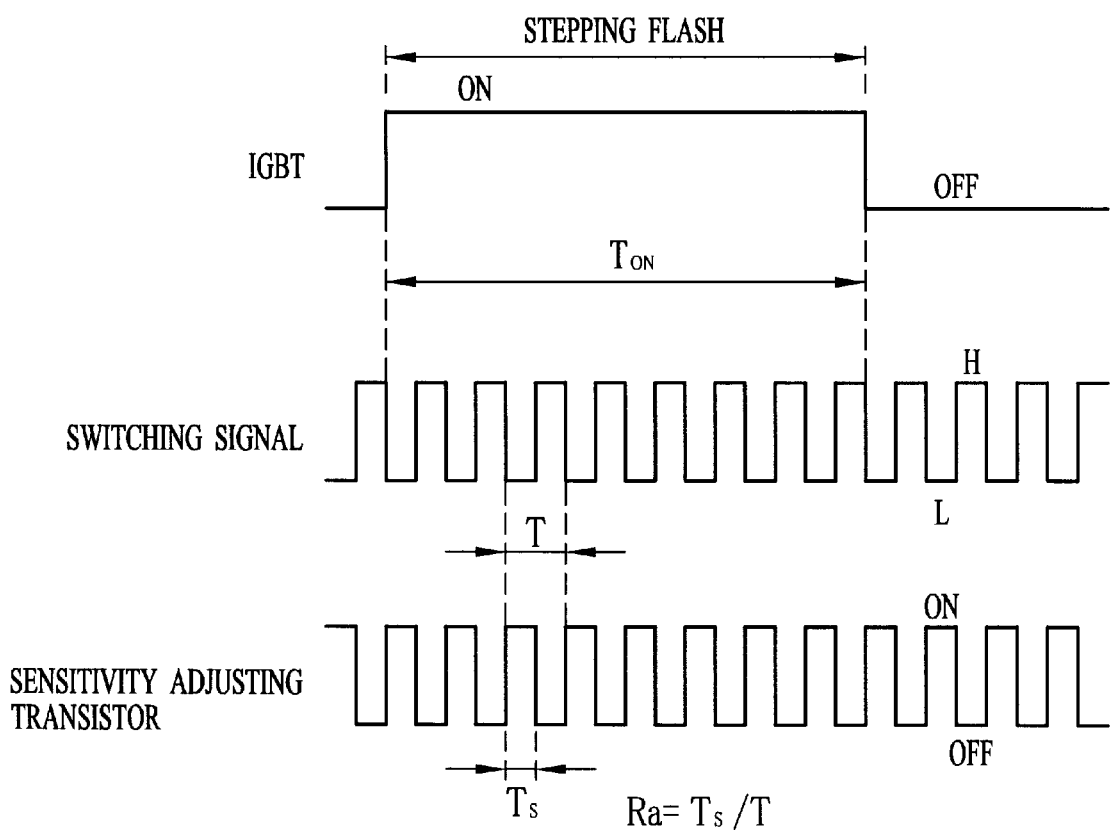
FIG. 18 is a timing chart for explaining an operation of a sensitivity adjusting transistor shown in FIG. 16.

A switching controller 52e outputs a switching signal to the transistor 51. As shown in FIG. 18, the switching controller 52e outputs the switching signal of which signal level is changed at a fixed cycle T. Moreover, the switching controller 52e outputs the switching signal such that a ratio of a period (Ts) outputting the "L level" to the cycle T of the switching signal is equal to the ratio Ra written in the EEPROM 23.

The transistor 51 is turned on while the switching signal is set to the "L level", and is turned off while the switching signal is set to the "H level". The transistor 51 is turned on and off at the fixed cycle T. A ratio of the on-period Ts to the cycle T is equal to the ratio Ra written in the EEPROM 23.

The cycle T of the switching signal is set so as to be sufficiently shorter than the on-period $T_{ON}$ during which the IGBT 31 is turned on by one time. Thus, while the stepping flash is performed by one time, the transistor 51 is turned on and off by several times.

In this way, the transistor 51 is repeatedly turned on and off, and the photocurrent flows from the phototransistor 18 only for the on-period during which the transistor 51 is turned on. In the whole light amount received by the phototransistor 18 during the individual stepping flash, only the light amount corresponding to the ratio Ra is converted to the photocurrent to be supplied to the capacitor 35. Thus, a ratio of the outputted integral voltage $V_{Cph}$ to the incidence-light amount of the phototransistor 18, namely the photosensitivity of the light receiving circuit 50 is adjusted.

Concretely, when the ratio Ra is "0.7" for example, only 70% of the whole light amount having entered the phototransistor 18 is converted to the photocurrent. By this photocurrent, the capacitor 35 is charged. Thus, in this case, the light receiving circuit 50 has the photosensitivity of 70% relative to the photosensitivity which is set at the time of continuously turning on the transistor 51.

As mentioned above, the ratio Ra is determined at the time of manufacturing and is written in the EEPROM 23. When the ratio Ra is determined, flashing is performed in a state that the switching signal is generated by using any ratio $Ra_T$ for testing. For example, the reference voltage data $D_N$ for the normal mode is used as the reference voltage data $D_{REF3}$, and flashing is stopped by an automatic light regulating function. Then, the exposure value $EV_T$ obtained by flashing is measured by an adjusting device. By using a difference between the exposure value $EV_T$ and the exposure value $EV_N$ corresponding to the normal mode, further by using the test ratio $Ra_T$ for testing, the ratio Ra being used is calculated at the time of photographing in accordance with the following formula $\hat{3}$. The ratio Ra may be easily determined so that adjustment is easily performed.

$$Ra = Ra_T / 2^{dE} \qquad \hat{3}$$

wherein $dE = EV_N - EV_T$

In this embodiment, when the ratio Ra is determined, the reference voltage data $D_N$ for the normal mode is used as the reference voltage data $D_{REF3}$. However, it is possible to use the reference voltage $D_L$ and $D_D$ for the light mode and the dark mode. Otherwise, it is possible to use other voltage data. In such cases, instead of the exposure value $EV_N$ in the foregoing formula 3, is used an exposure value corresponding to the voltage data used as the reference voltage data $D_{REF3}$.

An operation of the above structure is described below. In manufacturing, various parts are incorporated. The instant camera into which the flashing device and so forth are incorporated is sent to a step for adjusting the light regulation level. In this step, the microcomputer 52 of the instant camera is connected to an adjusting device which is not shown. Moreover, electric power is supplied from the adjusting device to the instant camera so that the instant camera is set in a operatable state.

The instant camera connected to the adjusting device is kept in a position that the flash emitting unit 11 and the flash receiving window 8 thereof face a test reflector having a predetermined reflectance. At this time, the flash emitting unit 11 and the flash receiving window 8 are positioned so as to keep an interval and an angle which are predetermined and fixed relative to the test reflector.

Figure 19:
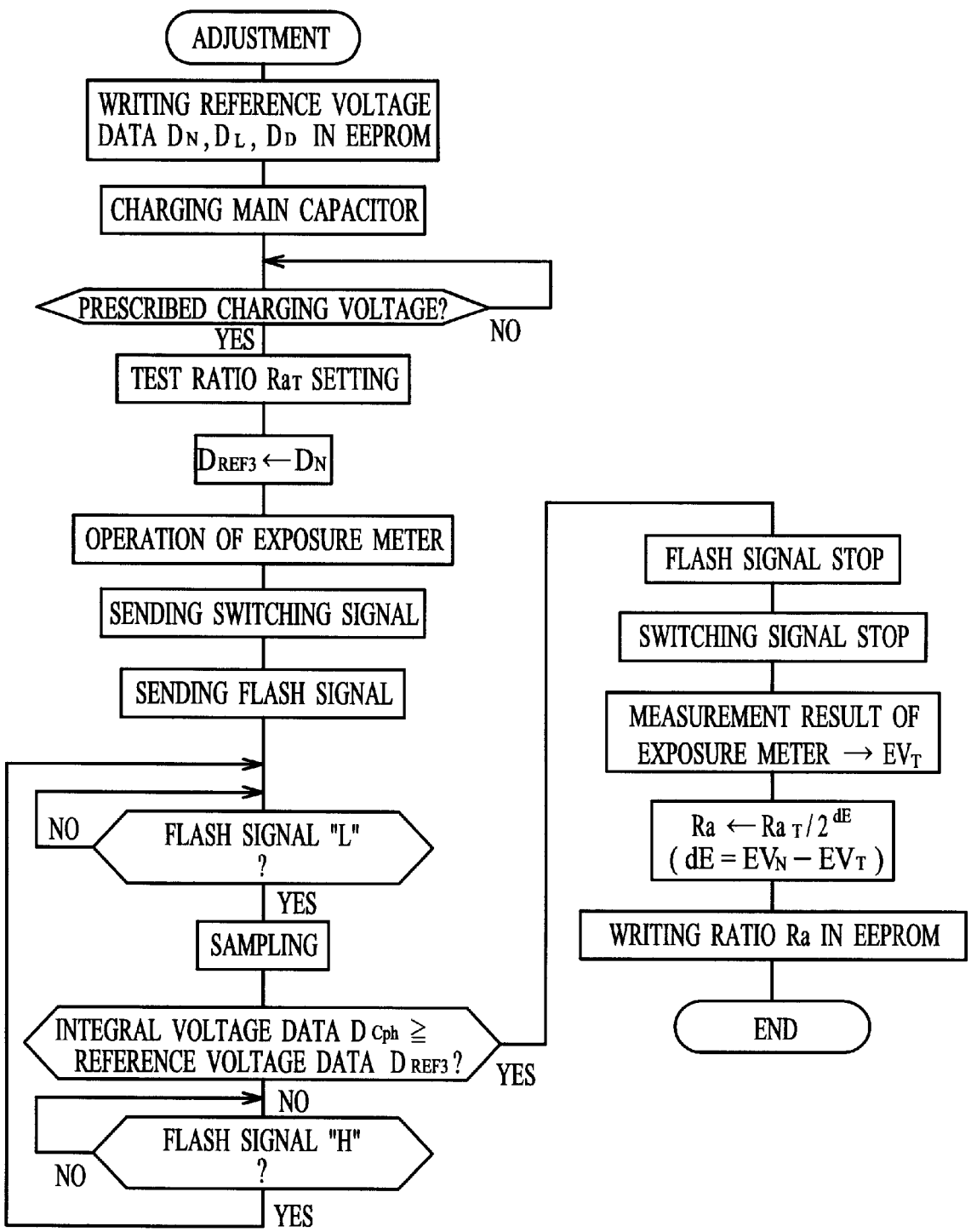
FIG. 19 is a flow chart showing a sequence for determining a ratio Ra of the example shown in FIG. 16.

After that, a sequence for determining the ratio Ra is executed such as schematically shown in FIG. 19. In this sequence, the reference voltage data $D_N$, $D_L$ and $D_D$ for the respective exposure correction modes are written in the EEPROM 23 at the outset. The reference voltage data $D_N$, $D_L$ and $D_D$ are utilized at the time of normal photographing. Incidentally, the reference voltage data $D_N$, $D_L$ and $D_D$ may be written in the EEPROM 23 in advance.

After writing the respective data, the booster circuit 25 is activated via the microcomputer 52 upon an instruction from the adjusting device. Owing to this, the main capacitor 26 is charged up to the prescribed charging voltage. At the same time, the trigger capacitor 29 is charged. Meanwhile, the reference voltage data $D_N$ is read from the EEPROM 23 as the reference voltage data $D_{REF3}$ compared with the integral voltage data $D_{Cph}$. This reference voltage data $D_N$ is set in the judging section 52d. Further, the test ratio $Ra_T$ for testing is set in the switching controller 52e from the adjusting device. As to the test ratio $Ra_T$, a value "1.0" is set in the switching controller 52e. Incidentally, the test ratio $Ra_T$ may be other value.

After that, an exposure meter of the adjusting device is set in an operatable state. A light receiving portion of the exposure meter is provided, for example, on the test reflector to receive the flash light. Based on the received light amount, the exposure value EVT by the flash light is outputted.

After operating the exposure meter, the adjusting device sends an instruction for flashing to the microcomputer 52. Upon receiving the instruction, the microcomputer 52 starts outputting the switching signal from the switching controller 52e. At this time, since the value "1.0" is set in the switching controller 52e as the test ratio $Ra_T$, the switching signal continuously kept at the "L level" is inputted into the photosensitivity adjusting transistor 51. Thus, the transistor 51 is continuously turned on.

Successively, the microcomputer 52 starts outputting the flash signal from the controller 52a. Upon this, flashing is started and the stepping flash is repeatedly performed. The flash light emitted during the individual stepping flash is reflected by the test reflector, and a part thereof enters the phototransistor 18 through the flash receiving window 8. The photosensitivity adjusting transistor 51 is continuously turned on so that the phototransistor 18 allows the photocurrent to flow in accordance with the incidence flash-light amount. By this photocurrent, the capacitor 35 is charged. Owing to this, the integral voltage $V_{Cph}$ is raised.

Whenever the individual stepping flash is completed, the integral voltage $V_{Cph}$ is sampled by the A-D converter 52c just after the stepping flash. The obtained integral voltage data $D_{Cph}$ is compared with the reference voltage data $D_{REF3}$ (the reference voltage data $D_N$) by the judging section 52d. In this judgment, when the integral voltage data $D_{Cph}$ is equal to the reference voltage data $D_{REF3}$ or more, the stop signal is sent to the controller 52a. However, when the integral voltage data $D_{Cph}$ is less than the reference voltage data $D_{REF3}$, the stop signal is not sent. Of course, the judging sequence is executed from sampling by the A-D converter 52c to the judgement by the judging section 52b. This sequence is completed within a period that the IGBT 31 is turned off.

For example, when it is detected, by the judging sequence performed just after the Mth stepping flash, that the integral voltage data $D_{Cph}$ reaches the reference voltage data $D_{REF3}$, the stop signal is sent from the judging section 52d to the controller 52a at that time. Upon this, the controller 52a continuously sets the flash signal to the "L level". Thus, the (M+1)th stepping flash and the succeeding stepping flash are not performed so that flashing is finished.

Meanwhile, as described above, the exposure meter of the adjusting device receives a part of the flash light while the stepping flash is performed. The exposure meter outputs the exposure value $EV_T$ corresponding to the whole amount of the received light. Hence, the light amount is integrated under a condition that the ratio $Ra_T$ is equal to "1.0", namely the photosensitivity of the light receiving circuit 50 is 100%. Thus, the exposure value $EV_T$ obtained from the exposure meter is the value in the case that the stepping flash has been performed until the integral voltage data $D_{Cph}$ reaches the reference voltage data $D_N$ for the normal mode.

After flashing has been finished, the exposure value $EV_T$ is sent to an arithmetic unit of the microcomputer or the like provided in the adjusting device. When the exposure value $EV_T$ obtained by the test flashing is inputted, the arithmetic unit applies the exposure value $EV_T$, the exposure value $EV_N$ corresponding to the normal mode, and the test ratio $Ra_T$ to the forgoing formula 3 to calculate the ratio set in the flashing device.

The calculated ratio Ra is sent from the adjusting device to the microcomputer 52, and is written in the EEPROM 23 by the microcomputer 52.

For example, in a case that the exposure value $EV_N$ is equal to 11 EV and the exposure value $EV_T$ is equal to 10 EV, the ratio Ra being a half value of the test ratio $Ra_T$ is written in the EEPROM 23 to be used at the time of photographing. In this case, the photosensitivity of the light receiving circuit 50 in the case of using the test ratio $Ra_T$ is twice relative to the proper photosensitivity of the light receiving circuit 50 in the case of using the set reference voltage data $D_N$, $D_L$ and $D_D$. This means that the proper photosensitivity is obtained if the ratio Ra used for photographing is set to a half value of the test ratio $Ra_T$ and the photocurrent supplied to the capacitor 35 is reduced to half.

Accordingly, in the case that the exposure value $EV_N$ is equal to 11 EV and the exposure value $EV_T$ is equal to 10 EV, when the value of the test ratio $Ra_T$ is 1.0, the ratio Ra whose value is 0.5 is written in the EEPROM 23. This is used at the time of normal photographing.

The instant camera in which the ratio Ra is written in the EEPROM 23 is shipped after incorporating the remaining parts and having a predetermined examination.

Figure 20:
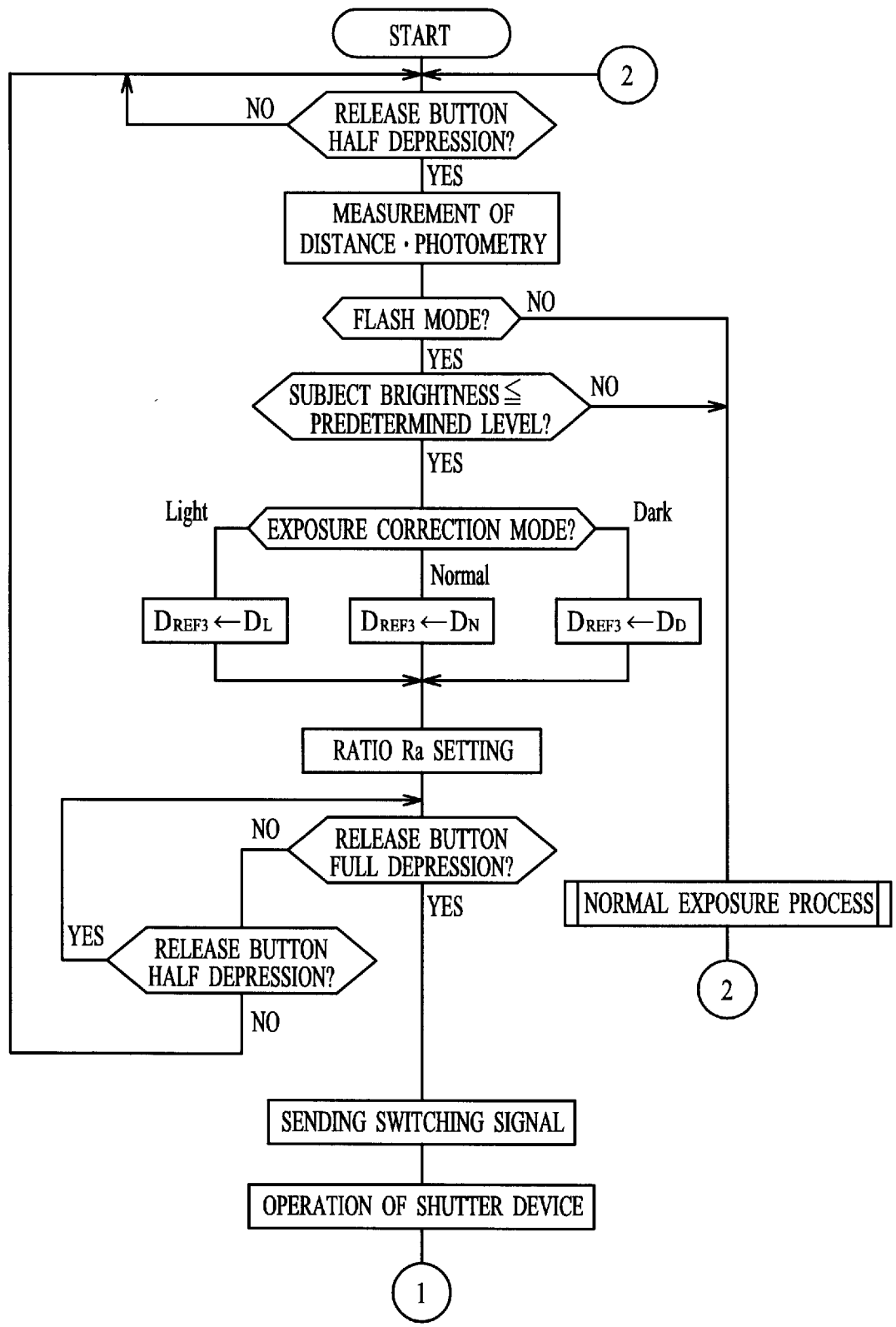
FIG. 20 is a flow chart showing a flashing sequence of the example shown in FIG. 16.
Figure 21:
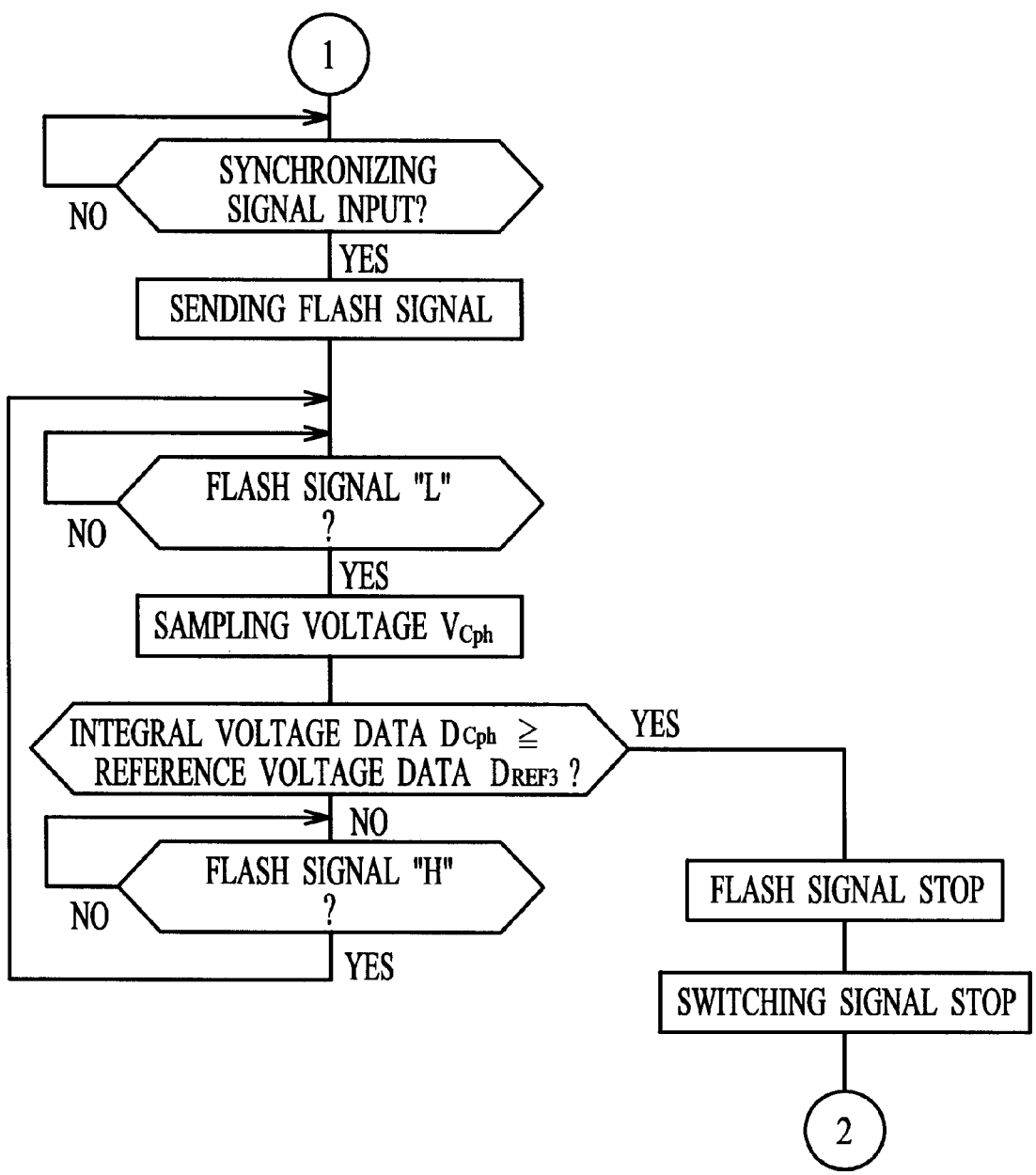
FIG. 21 is a continuance of the flow chart shown in FIG. 20.

In normal photographing, as shown in FIGS. 20 and 21, when the release button 10 is depressed by half a stroke, a subject distance is measured by the light emitting unit and the light receiving unit, further, subject brightness is measured by the light receiving element for photometry. At the same time, the flash mode selected by the setting button 14 is checked.

In the case that the automatic flash mode is selected by the setting button 14, the exposure correction mode selected by the setting button 14 is successively checked when the subject brightness is equal to the predetermined level or less. Then, the reference voltage data corresponding to the selected exposure correction mode is read from the EEPROM 23 by the microcomputer 52.

In the case that the normal mode is selected as the exposure correction mode, the reference voltage data $D_N$ for the normal mode is read from the EEPROM 23 and is set in the judging section 52d as the reference voltage data $D_{REF3}$. Moreover, despite the selected exposure correction mode, the ratio Ra is read from the EEPROM 23 and is set in the switching controller 52e.

When the release button 10 is fully depressed, focusing of the taking lens 6 is performed in accordance with the obtained subject distance. After that, the switching signal is started to be sent from the switching controller on the basis of the ratio Ra. Owing to this, the transistor 51 for adjusting the sensitivity is repeatedly turned on and off. At this time, a ratio of the on-period Ts to the cycle T for turning on and off the transistor 51 is identical with the ratio Ra determined at the time of manufacturing. Incidentally, when the ratio Ra is 1.0, the transistor 51 is continuously turned on.

After the switching signal has been started to be sent, the shutter device 36 is activated to operate the shutter blade at the shutter speed and the stop value for flashing. When the synchronizing signal is inputted into the microcomputer 52 in synchronism with the operation of the shutter blade, the flash signal is started to be sent from the controller 52a. Upon this, the IGBT 31 is turned on and off so that the stepping flash is performed. The stepping flash is repeatedly performed until the integral voltage data $D_{Cph}$ reaches the reference voltage data $D_{REF3}$.

Whenever the stepping flash is performed, the emitted flash light is reflected by the subject, and a part thereof enters the phototransistor 18. In accordance with the received light amount, the phototransistor 18 lets the photocurrent flow while the transistor 51 is turned on. This photocurrent is supplied to the capacitor 35. Meanwhile, when the transistor 51 is turned off, the photocurrent does not flow even if the light enters the phototransistor 18.

The transistor 51 is turned on and off many times during the individual stepping flash so that the light amount converted to the photocurrent is identical with the ratio Ra relative to the whole light amount entering the phototransistor during the stepping flash. For example, when the value of the ratio Ra is 0.5, the photocurrent corresponding to 50% of the whole light amount flows. Then, the capacitor 35 is charged by the photocurrent so that the integral voltage $V_{Cph}$ is raised.

As a result, the light amount is integrated by the light receiving circuit 32 in accordance with the ratio Ra. In other words, the light amount is integrated with the ratio of the integral voltage $V_{Cph}$ to the incidence-light amount of the phototransistor 18, namely under a state that the photosensitivity of the light receiving circuit 32 is adjusted. The integral voltage $V_{Cph}$ is sampled to be converted to the integral voltage data $D_{Cph}$ whenever the individual stepping flash is completed. When the integral voltage data $D_{Cph}$ reaches the reference voltage data $D_{REF3}$, the stop signal is sent at that time. Thus, the successive stepping flash is not performed so that flashing of one exposure is finished.

With respect to the flash light emitted to the subject, a part thereof enters the instant photo film 17 via an opening formed by the shutter blade to expose the instant photo film 17. After completing the operation of the shutter blade, the exposed instant photo film is extruded from the outlet 16 in a developed state. When a predetermined time has passed, a photo print is obtained. In this way, since the photosensitivity of the light receiving circuit 50 is adjusted, the normal exposure amount is substantially given to the instant photo film 17. Hence, the photo print having normal density gradation is obtained.

In the case of the light mode, the reference voltage data $D_L$ for the light mode is set in the judging section 52d as the reference voltage data $D_{REF3}$. Thus, when the integral voltage data $D_{Cph}$ reaches the reference voltage data $D_L$, flashing is stopped. Upon this, the exposure amount of the flash light is increased by ⅔ EV in comparison with the case of the normal mode so that the photo print having lighter density gradation is obtained.

In the case of the dark mode, the reference voltage data $D_D$ for the dark mode is set in the judging section 52d as the reference voltage data $D_{REF3}$. Thus, the exposure amount of the flash light is reduced by ⅔ EV in comparison with the case of the normal mode so that the photo print having darker density gradation is obtained.

In the above embodiment, flashing is performed by turning on and off the IGBT in the fixed on-period and the fixed off-period through one exposure. However, the on-period and the off-period of the IGBT may be changed based on the time from the commencement of flashing, the number of turning on the IGBT, and the integral voltage data $D_{Cph}$. Moreover, the stepping flash may be repeatedly performed at the beginning of flashing, and after that, the successive flash may be performed.

Figure 22:
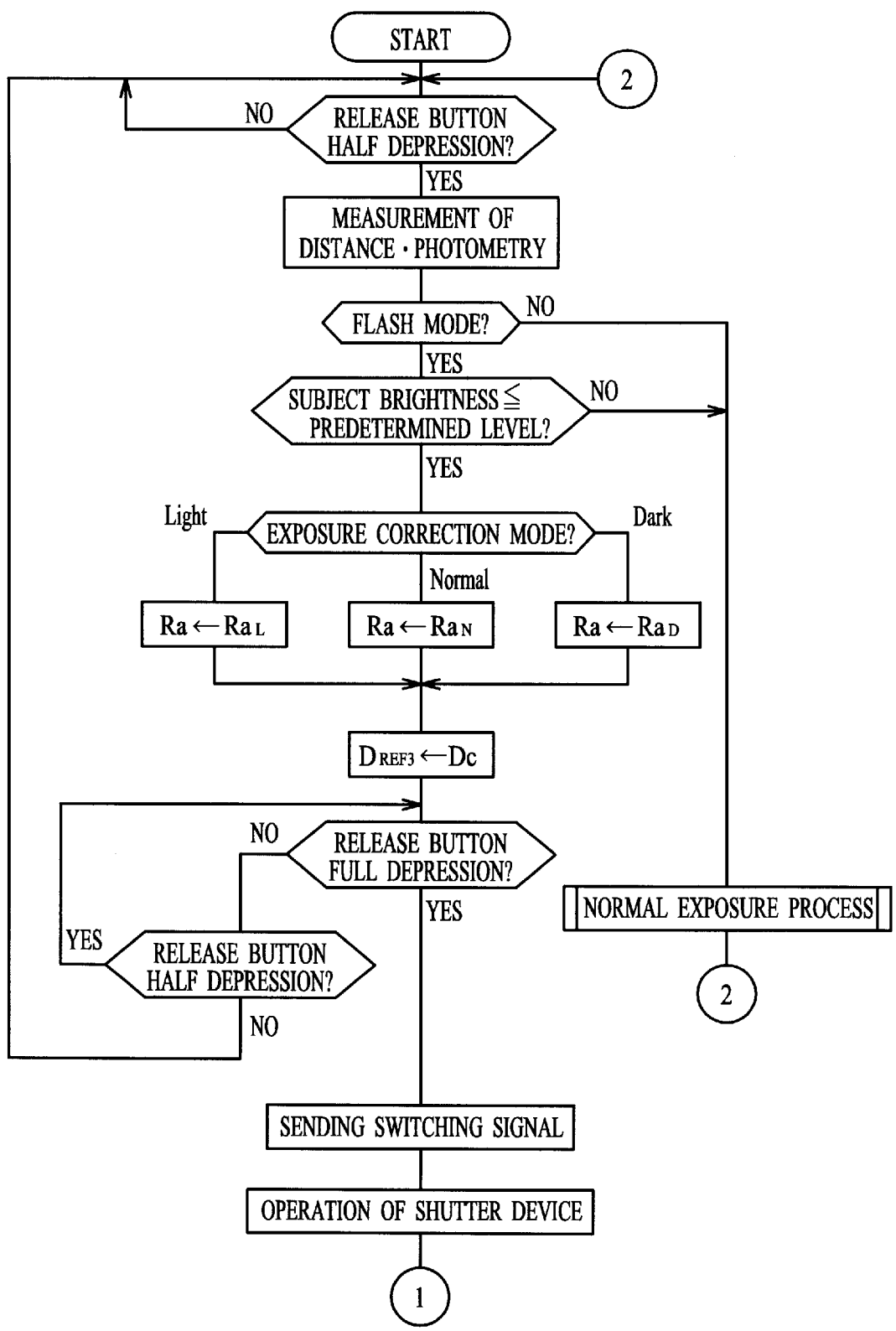
FIG. 22 is a flow chart showing an example in which exposure correction is performed by changing the ratio Ra.
Figure 23:
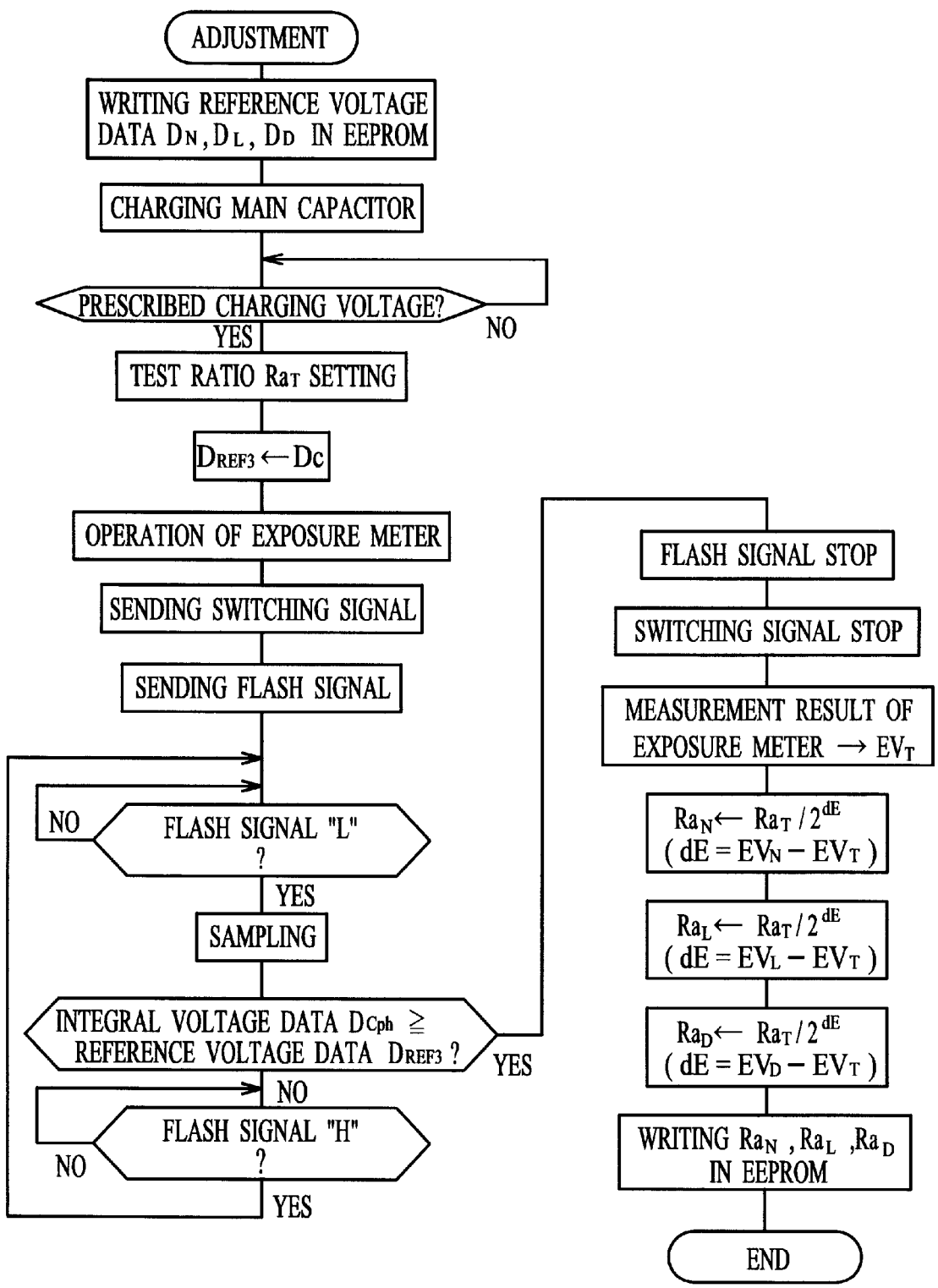
FIG. 23 is a flow chart showing a sequence for determining the respective ratios of the example shown in FIG. 22.

In the above embodiment, the exposure amount is corrected by changing the reference voltage data compared with the integral voltage data. However, instead of the sequence shown in FIG. 20, the exposure correction may be performed by changing the ratio Ra such as shown in FIG. 22. A ratio $Ra_N$ for the normal mode, a ratio $Ra_L$ for the light mode, and a ratio $Ra_D$ for the dark mode are determined at the time of adjustment such as shown in FIG. 23, and are written in the EEPROM of the instant camera. In this case, the reference voltage data Dc which is common to the respective exposure correction modes is used as the reference voltage data $D_{REF3}$.

A single ratio, for example, only the ratio $Ra_N$ for the normal mode may be written in the EEPROM. With respect to the ratio $Ra_L$ for the light mode and the ratio $Ra_D$ for the dark mode, they may be obtained by the following formulas 4 and 5 operated by the microcomputer, using the ratio $Ra_N$ for the normal mode.

$$Ra_L = Ra_N / 2^{dE1} \qquad 4$$

wherein $dE1 = EV_L - EV_N$ $$Ra_D = Ra_N / 2^{dE2} \qquad 5$$

wherein $dE2 = EV_D - EV_N$

Figure 24:
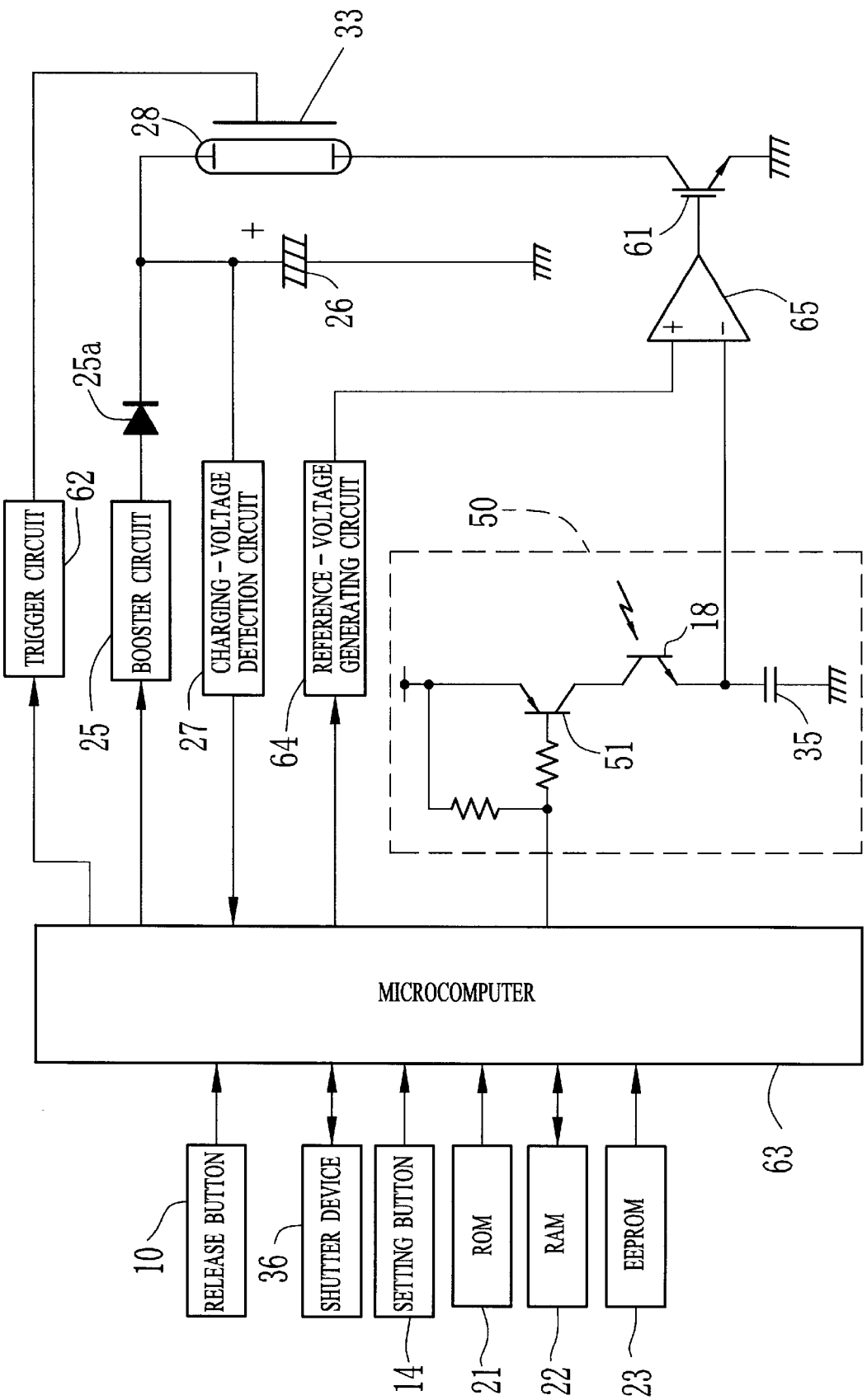
FIG. 24 is a circuit diagram of the flashing device showing an example in which flashing is controlled by using a voltage comparator.

FIG. 24 shows an embodiment in which flashing is stopped by using a voltage comparator instead of controlling the stop of flashing by checking the integrated light amount with the microcomputer. Except the following, this embodiment is similar to the forgoing embodiment shown in FIGS.

16 through 21. A similar constituting member is denoted by the same reference numeral, and description thereof is omitted.

The flash discharge tube 28 is connected to the main capacitor 26 in parallel, and a IGBT 61 is connected between them. The IGBT 61 is turned on prior to flashing and is turned off at the time of stopping the flash. A trigger circuit 62 applies a trigger voltage to the flash discharge tube 28 when the synchronizing signal is inputted from the shutter device 36 via a microcomputer 63. Hence, the electric charge of the main capacitor 26 is discharged in the flash discharge tube 28 via the IGBT being turned on so that flashing is started. In this embodiment, the successive flash is performed.

A reference-voltage generating circuit 64 is controlled by the microcomputer 62 at the time of flashing, and outputs any one of reference voltages $V_N$, $V_L$ and $V_D$ as a reference voltage $V_{REF4}$ in accordance with the exposure correction mode selected by the setting button 14. The integral voltage $V_{Cph}$ from the light receiving circuit 50 is inputted into an inversion input terminal of a voltage comparator 65. The reference voltage $V_{REF4}$ from the reference-voltage generating circuit 64 is inputted into a non-inversion terminal of the voltage comparator 65.

The voltage comparator 65 sets a comparison signal to a "H level" when the integral voltage $V_{Cph}$ is less than the reference voltage $V_{REF4}$. When the integral voltage $V_{Cph}$ reaches the reference voltage $V_{REF4}$, strictly speaking, when the integral voltage $V_{Cph}$ slightly exceeds the reference voltage $V_{REF4}$, the comparison signal is set to a "L level". The "H level" of the comparison signal is adapted to be more than a gate voltage required for turning on the IGBT 61. The "L level" is set to 0 V, for example. Owing to this, the IGBT 61 is turned on when the integral voltage $V_{Cph}$ is less than the reference voltage $V_{REF4}$, and is turned off when the integral voltage $V_{Cph}$ reaches the reference voltage $V_{REF4}$.

As described above, the IGBT 61 is turned on prior to flashing. In other words, the IGBT 61 is turned on by applying the reference voltage $V_{REF4}$ (>0 V) to the voltage comparator 65 when the integral voltage $V_{Cph}$ from the light receiving circuit 50 is substantially 0 V. When the phototransistor 18 receives the flash light reflected by a subject during flashing and the integral voltage $V_{Cph}$ reaches the reference voltage $V_{REF4}$, the IGBT 61 is turned off. Hence, connection between the flash discharge tube 28 and the main capacitor 26 is cut so that flashing is stopped.

The microcomputer 63 controls the booster circuit 25, the trigger circuit 62, and the reference-voltage generating circuit 64. Besides these, the microcomputer 63 controls the sensitivity adjusting transistor 51 in accordance with the switching signal based on the ratio Ra so that the photosensitivity the light receiving circuit 50 is adjusted.

According to this flashing device, the successive flash is started in synchronism with the operation of the shutter blade similarly to the conventional one. Then, a part of the flash light reflected by a subject is received by the phototransistor 18 during the successive flash. While the transistor 51 is turned on, the photocurrent corresponding to the received light amount flows to be charged in the capacitor 35. Thus, the integral voltage $V_{Cph}$ is raised. When the integral voltage $V_{Cph}$ reaches the reference voltage $V_{REF4}$, the comparison signal from the voltage comparator 65 is set to the "L level". Owing to this, the IGBT 61 is turned off so that flashing of one exposure is finished.

Also in this case, the photosensitivity of the light receiving circuit 50 is adjusted in accordance with the ratio Ra. Thus, the flash-light amount relative to the instant photo film is regulated so as to correspond to the exposure correction mode selected by the setting button 14. When the ratio Ra is determined, the set ratio Ra can be calculated from the exposure value $EV_T$ obtained by performing the test flash, the exposure value $EV_N$ corresponding to the normal mode, and the test ratio $Ra_T$, using the reference voltage actually outputted from the reference-voltage generating circuit 64, for example the reference voltage $V_N$. Thus, adjusting the photosensitivity may be easily performed.

Incidentally, by using the reference voltages $V_N$, $V_L$ and $V_D$, the ratios Ra used in the respective exposure correction modes may be calculated and may be selectively used in accordance with the exposure correction mode. In this case, even if dispersion exists in the mutual ratio of the reference voltages $V_N$, $V_L$ and $V_D$, it is possible to obtain the proper exposure amounts corresponding to the respective exposure correction mode.

Moreover, besides the method for changing the reference voltage $V_{REF4}$ in accordance the exposure correction mode, it is possible to adopt a method for changing the ratio Ra in accordance with the exposure correction mode under a condition that the reference voltage $V_{REF4}$ is fixed.

Further, when the stepping flash is performed, stopping the flash may be controlled by using the voltage comparator. In this case, an AND operation is carried out, with an AND circuit, relative to the flash signal for the stepping flash and the output of the voltage comparator, for example. The obtained result is supplied to the IGBT 31 shown in FIG. 16 for example.

Figure 25:
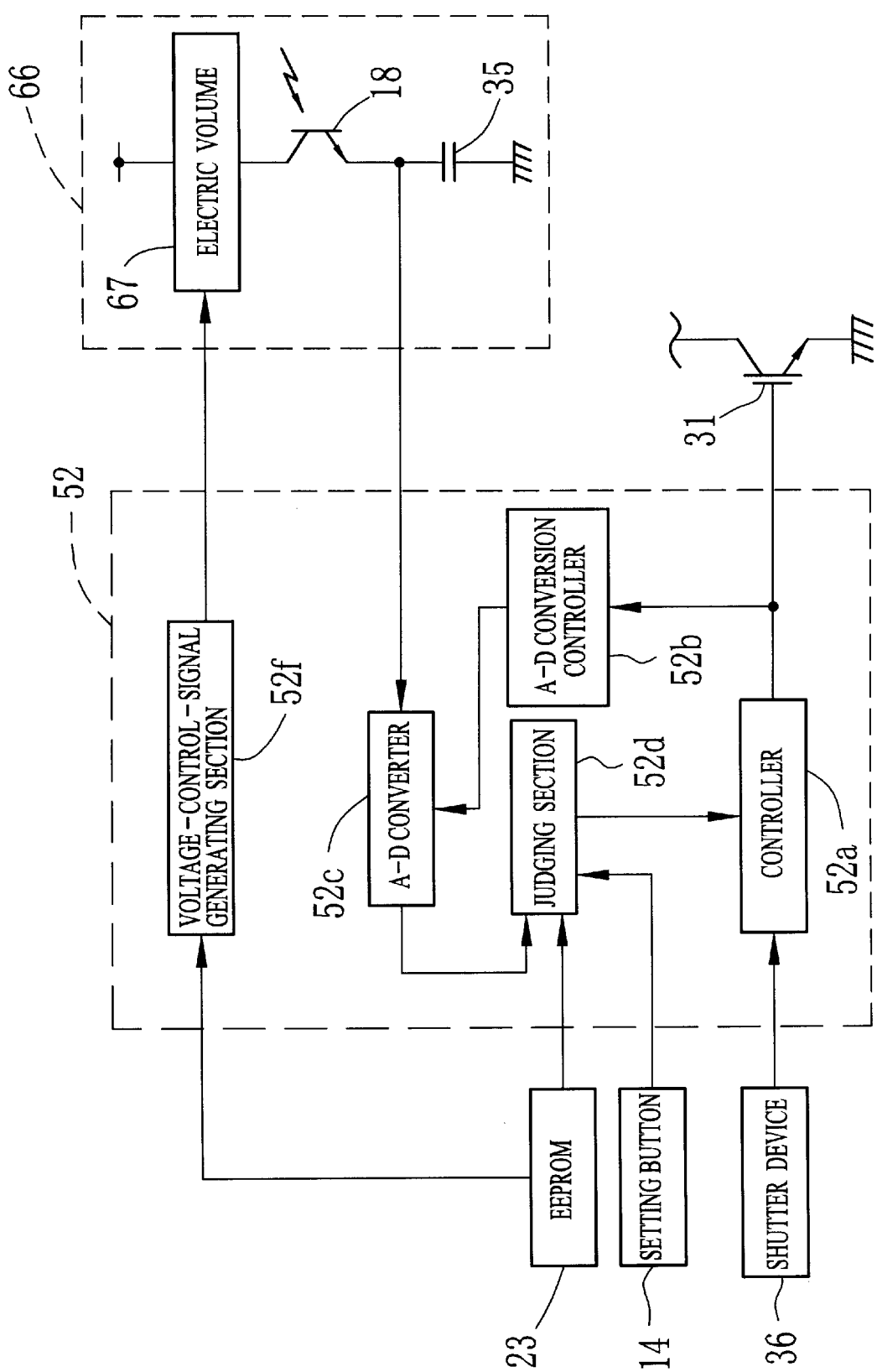
FIG. 25 is a circuit diagram of the flashing device showing an example in which photosensitivity of the light receiving circuit is adjusted by changing a voltage applied to a photo transistor.

FIG. 25 shows an embodiment in which the photosensitivity of the light receiving circuit is adjusted by changing a voltage applied to the phototransistor of the light receiving circuit, instead of changing the ratio Ra of the on-period to the cycle T for turning on and off the sensitivity adjusting transistor.

In FIG. 25, a light receiving circuit 66 is constituted of the phototransistor 18, the capacitor 35, and an electric volume 67 being as a voltage applying member for outputting a voltage corresponding to a voltage-control signal. The electric volume 67 is constituted of a D-A converter and so forth, as well-known. When applied-voltage data $D_V$ being as the voltage-control signal is inputted from the microcomputer 52, the inputted applied-voltage data $D_V$ is linearly converted to a voltage and is outputted. The outputted voltage is applied to the collector terminal of the phototransistor 18. A voltage-control-signal generating section 52f of the microcomputer 52 inputs the applied voltage data $D_V$ into the electric volume 67 during flashing. The applied-voltage data $D_V$ is determined relative to each instant camera at the time of manufacturing and is written in the EEPROM 23. Incidentally, the other structure is similar to that shown in FIG. 17, and an identical member is denoted by the same reference numeral.

According to this structure, the photocurrent flows in accordance with the light amount having entered the phototransistor 18, and this photocurrent is proportionally changed in response to the voltage applied from the electric volume 67 to the phototransistor 18. As a result, the photosensitivity of the light receiving circuit 66 may be adjusted.

When the applied-voltage data $D_V$ is determined, flashing is performed in a state that a proper voltage is applied from the electric volume 67 to the phototransistor 18, using any applied-voltage data $D_{VT}$ for testing. Then, flashing is stopped by the automatic light regulating function, using the reference voltage data $D_N$ for the normal mode, for example. The exposure value $EV_T$ obtained by this flash is measured by the adjusting device. The electric volume 67 linearly converts the applied-voltage data to the voltage. By utilizing this, it is possible to calculate the actually-used applied-voltage data $D_V$ with the following formula 6. At this time, are used a difference between the exposure value $EV_T$ and the exposure value $EV_N$ corresponding to the normal mode, and the test applied-voltage data $D_{VT}$ used at the time of flashing. Thus, the applied-voltage data $D_V$ may be easily determined. Further, the photosensitivity of the light receiving circuit 66 may be easily adjusted.

$$D_V = D_{VT}/2^{dE} \qquad \hat{6}$$

wherein $dE = EV_N - EV_T$

In the above embodiment, the electric volume is used as the voltage applying member. However, the photosensitivity may be adjusted by changing the applied-voltage of the phototransistor, using another circuit or element. Incidentally, the voltage applying member is preferable to linearly convert the inputted voltage-control signal to the voltage. However, it is possible to use a circuit and an element for non-linearly converting the voltage-control signal to the voltage. In this case, the voltage-control signal actually used needs to be determined based on its properties.

In case the transistor is connected to the phototransistor in series, the photosensitivity is adjusted by changing its base current and by changing the applied voltage of the phototransistor. In this case, the base current may be determined by an operation similar to the forgoing formula $\hat{6}$ within a working range of the transistor where the voltage between the emitter and the collector is linearly changed based on the base current. Meanwhile, within the working range where the voltage between the emitter and the collector is non-linearly changed, the base current needs to be determined on the basis of changing properties of the voltage between the emitter and the collector.

Instead of changing the reference voltage $V_{REF4}$ in accordance with the exposure correction mode, the light-regulation level of the flash light may be adjusted by changing the applied-voltage data $D_V$ in accordance with the exposure correction mode under a condition that the reference voltage $V_{REF4}$ is fixed.

The method for adjusting the photosensitivity by changing the applied voltage of the phototransistor is applicable to a case using the voltage comparator shown in FIG. 24. Moreover, this method is also applicable to a case in that the photocurrent from the phototransistor is converted to the light-reception voltage, and based on which the light amount is integrated.

It is also possible to adjust the photosensitivity by using both of the applied voltage of the phototransistor and the ratio Ra of the on-period to the cycle for turning on and off the sensitivity adjusting transistor.

In the above embodiments, the present invention is applied to the flashing device incorporated in the instant camera. However, the flashing device according to the present invention is applicable to a camera using a photo film of the 135-type and so forth. Moreover, the present invention is applicable to a flashing device incorporated in various cameras, for example a digital still camera. Further, the present invention is applicable to a flashing device attached to a camera.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A flashing device of an automatic light-regulation type including a main capacitor charged prior to flashing and a flash discharge tube connected to said main capacitor, a flash-light amount being adjusted such that an exposure amount in flash photographing is set to a predetermined level, said flash device comprising:

a semiconductor switching element connected between said main capacitor and said flash discharge tube;

a control device for setting said semiconductor switching element in an intermittent operation mode in response to a start signal of flashing and for setting said semiconductor switching element in a non-operation mode in response to a stop signal of flashing, said semiconductor switching element being repeatedly turned on and off in said intermittent operation mode to perform pulse-state flashing while intermittently turned on, and said semiconductor switching element being continuously turned off in said non-operation mode; and light regulating means for receiving a flash light reflected by a subject and for integrating a light amount, said light regulating means generating said stop signal when an integral amount of said light amount reaches a value corresponding to said predetermined level;

wherein the start signal of flashing is synchronized with a shutter device, so that the pulse-state flashing takes place while the shutter device is open.

2. A flashing device according to claim 1, wherein said semiconductor switching element is a bipolar transistor.

3. The flashing device of claim 1, wherein light emitted by the flashing device is within the visible spectrum.

4. A flashing device of an automatic light-regulation type including a main capacitor charged prior to flashing and a flash discharge tube connected to said main capacitor, a flash-light amount being adjusted such that an exposure amount in flash photographing is set to a predetermined level, said flash device comprising:

a semiconductor switching element connected between said main capacitor and said flash discharge tube;

a control device for setting said semiconductor switching element in an intermittent operation mode in response to a start signal of flashing and for setting said semiconductor switching element in a non-operation mode in response to a stop signal of flashing, said semiconductor switching element being repeatedly turned on and off in said intermittent operation mode to perform pulse-state flashing while intermittently turned on, and said semiconductor switching element being continuously turned off in said non-operation mode; and light regulating means for receiving a flash light reflected by a subject and for integrating a light amount, said light regulating means generating said stop signal when an integral amount of said light amount reaches a value corresponding to said predetermined level;

wherein said light regulating means comprises:

a light receiving circuit including a light receiving element for generating a photocurrent corresponding to the received light amount and a resistance for converting said photocurrent to a voltage;

an A-D converter for sampling said voltage while said semiconductor switching element is turned on, said A-D converter performing conversion to voltage data;

integrating means for integrating said voltage data obtained from said A-D converter to output integral voltage data; and judging means for comparing said integral voltage data with predetermined reference voltage data corresponding to said predetermined level, said judging means generating said stop signal when said integral voltage data is equal to said reference voltage data or more.

5. A flashing device according to claim 4, wherein said control device determines one of an on-period and an off-period of said semiconductor switching element on the basis of said integral voltage data under said intermittent operation mode.

6. A flashing device according to claim 4, wherein said control device changes one of an on-period and an off-period of said semiconductor switching element on the basis of a passage time under said intermittent operation mode.

7. A flashing device according to claim 4, wherein said control device changes one of an on-period and an off-period of said semiconductor switching element on the basis of a number of turning on said semiconductor switching element under said intermittent operation mode.

8. A flashing device according to any one of claims 5, 6 and 7, wherein said control device further sets a continuous operation mode for continuously turning on said semiconductor switching element, said semiconductor switching element being set in said continuous operation mode to perform successive flashing when a predetermined period has passed from the commencement of said intermittent operation mode or when said semiconductor switching element has been turned on by predetermined times, and said light regulating means executes said judging sequence at fixed cycles.

9. A flashing device of an automatic light-regulation type including a main capacitor charged prior to flashing and a flash discharge tube connected to said main capacitor, a flash-light amount being adjusted such that an exposure amount in flash photographing is set to a predetermined level, said flash device comprising:

a semiconductor switching element connected between said main capacitor and said flash discharge tube;

a control device for setting said semiconductor switching element in an intermittent operation mode in response to a start signal of flashing and for setting said semiconductor switching element in a non-operation mode in response to a stop signal of flashing, said semiconductor switching element being repeatedly turned on and off in said intermittent operation mode to perform pulse-state flashing while intermittently turned on, and said semiconductor switching element being continuously turned off in said non-operation mode; and light regulating means for receiving a flash light reflected by a subject and for integrating a light amount, said light regulating means generating said stop signal when an integral amount of said light amount reaches a value corresponding to said predetermined level;

wherein said light regulating means comprises:
  a light receiving circuit including a light receiving element for generating a photocurrent corresponding to the received flash light and a capacitor charged by said photocurrent, said capacitor outputting a charging voltage as an integral voltage corresponding to said integral amount of the flash light;
  an A-D converter for sampling said integral voltage and for converting to integral voltage data before outputting; and
  judging means for comparing said integral voltage data with predetermined reference voltage data corresponding to said predetermined level whenever said integral voltage data is outputted from said A-D converter, said judging means generating said stop signal when said integral voltage data is equal to said reference voltage data or more.

10. A flashing device according to claim 9, wherein said light regulating means executes a judging sequence from sampling by said A-D converter to judgment by said judging means during each flashing.

11. A flashing device of an automatic light-regulation type including a light receiving circuit having a light receiving element and a capacitor, said light receiving element receiving a flash light reflected by a subject and letting a photocurrent corresponding to the received light amount flow, said capacitor being charged by said photocurrent, said light receiving circuit integrating said received light amount and outputting a charging voltage of said capacitor as an integral voltage, and when said integral voltage reaches a predetermined reference voltage, flashing being stopped to set an exposure amount in flash photographing to a predetermined level, said flashing device comprising:

a semiconductor switching element connected to said light receiving element in series; and a switching controller for repeatedly turning on and off said semiconductor switching element at predetermined cycles and for emitting a pulse-state flash light, wherein photosensitivity of said light receiving circuit is adjusted by varying a ratio of an on-period of said semiconductor switching element to said predetermined cycles.

12. A flashing device according to claim 11, wherein said semiconductor switching element is a transistor.

13. A flashing device of an automatic light-regulation type including a light receiving element and an integrating circuit, said light receiving element receiving a flash light reflected by a subject and letting a photocurrent corresponding to the received light amount flow, said integrating circuit integrating said photocurrent, and when an integral amount obtained by said integrating circuit reaches a predetermined level, flashing being stopped to set an exposure amount in flash photographing to a predetermined level, said flashing device comprising:

control-signal generating means for generating a predetermined control signal during flashing; and voltage applying means for outputting a voltage corresponding to said control signal and for applying said voltage to said light receiving element, wherein photosensitivity of said light receiving circuit is adjusted by varying said voltage applied to said light receiving element.

14. A flashing device according to claim 13, wherein said integrating circuit is a capacitor being charged by said photocurrent flowing in said light receiving element, said capacitor outputting a charging voltage as an integral voltage corresponding to said integral amount, and when said integral voltage reaches a reference voltage corresponding to said predetermined level, flashing is stopped.

15. A flashing device according to claim 14, further comprising:

a voltage comparator for detecting that said integral voltage has reached said reference voltage.

* * * * *